United States Patent [19]
Kanki et al.

[11] Patent Number: 5,884,237
[45] Date of Patent: Mar. 16, 1999

[54] AUTOMATIC DOOR SYSTEM WITH SELF-DIAGNOSING FUNCTION

[75] Inventors: Hisayuki Kanki, Kobe; Naoki Taguchi, Akashi, both of Japan

[73] Assignee: Nabco Limited, Kobe, Japan

[21] Appl. No.: 857,035

[22] Filed: May 15, 1997

[30] Foreign Application Priority Data

May 17, 1996 [JP] Japan ................................. 8-147949
Apr. 24, 1997 [JP] Japan ................................. 9-122915

[51] Int. Cl.⁶ ................................................. E05F 15/00
[52] U.S. Cl. ........................ 702/113; 702/108; 702/57; 702/99; 702/174; 318/466; 318/480
[58] Field of Search ...................... 364/551.01; 318/480, 318/282, 266, 286, 603, 602, 640, 466; 702/113, 108, 57, 99, 174, 283

[56] References Cited

U.S. PATENT DOCUMENTS

| | | | |
|---|---|---|---|
| 4,529,920 | 7/1985 | Yoshida et al. | 318/466 |
| 4,560,912 | 12/1985 | Jonsson | 318/480 |
| 4,563,625 | 1/1986 | Kornbrekke et al. | 318/603 |
| 5,175,400 | 12/1992 | Hirabayashi et al. | 187/316 |
| 5,226,370 | 7/1993 | Templeton et al. | 318/480 |
| 5,315,220 | 5/1994 | Takimoto et al. | 318/282 |

FOREIGN PATENT DOCUMENTS 63-83384 6/1988 Japan.
4-203187 7/1992 Japan.

*Primary Examiner*—John Barlow
*Assistant Examiner*—Hien Vo
*Attorney, Agent, or Firm*—William H. Murray

[57] ABSTRACT

An automatic door system includes a door which id driven to open and close by a motor. A sensor senses an object which approaches or leaves the door. A control section controls the motor in accordance with a signal supplied from the sensor. The control section includes a CPU which examines the motor, the sensor and the control section for failure or malfunction, and also an EEPROM which stores the result of examination made by the CPU. The result of examination stored in the EEPROM is outputted to a Handy Terminal or a personal computer.

26 Claims, 29 Drawing Sheets

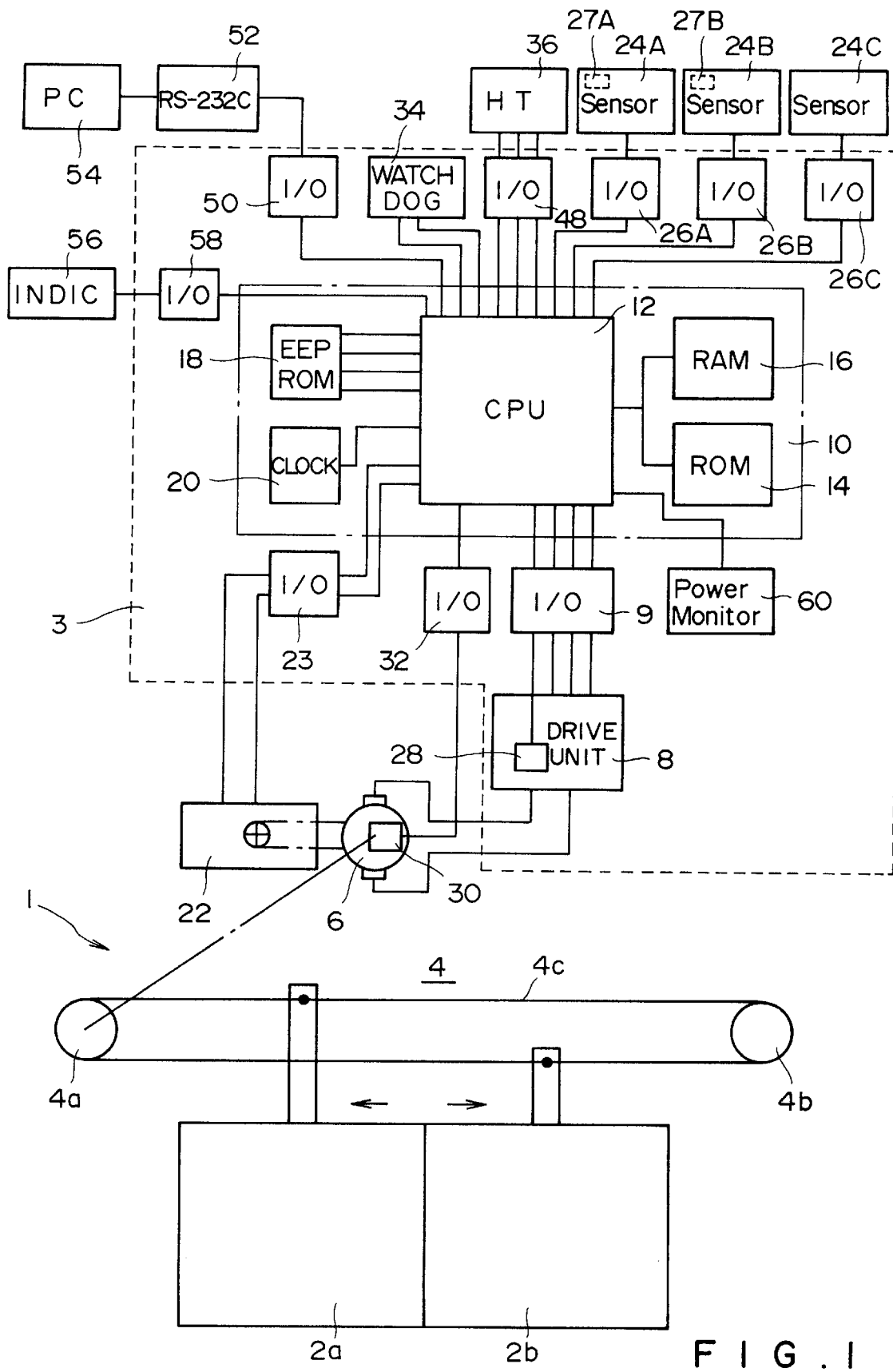
F I G . 1

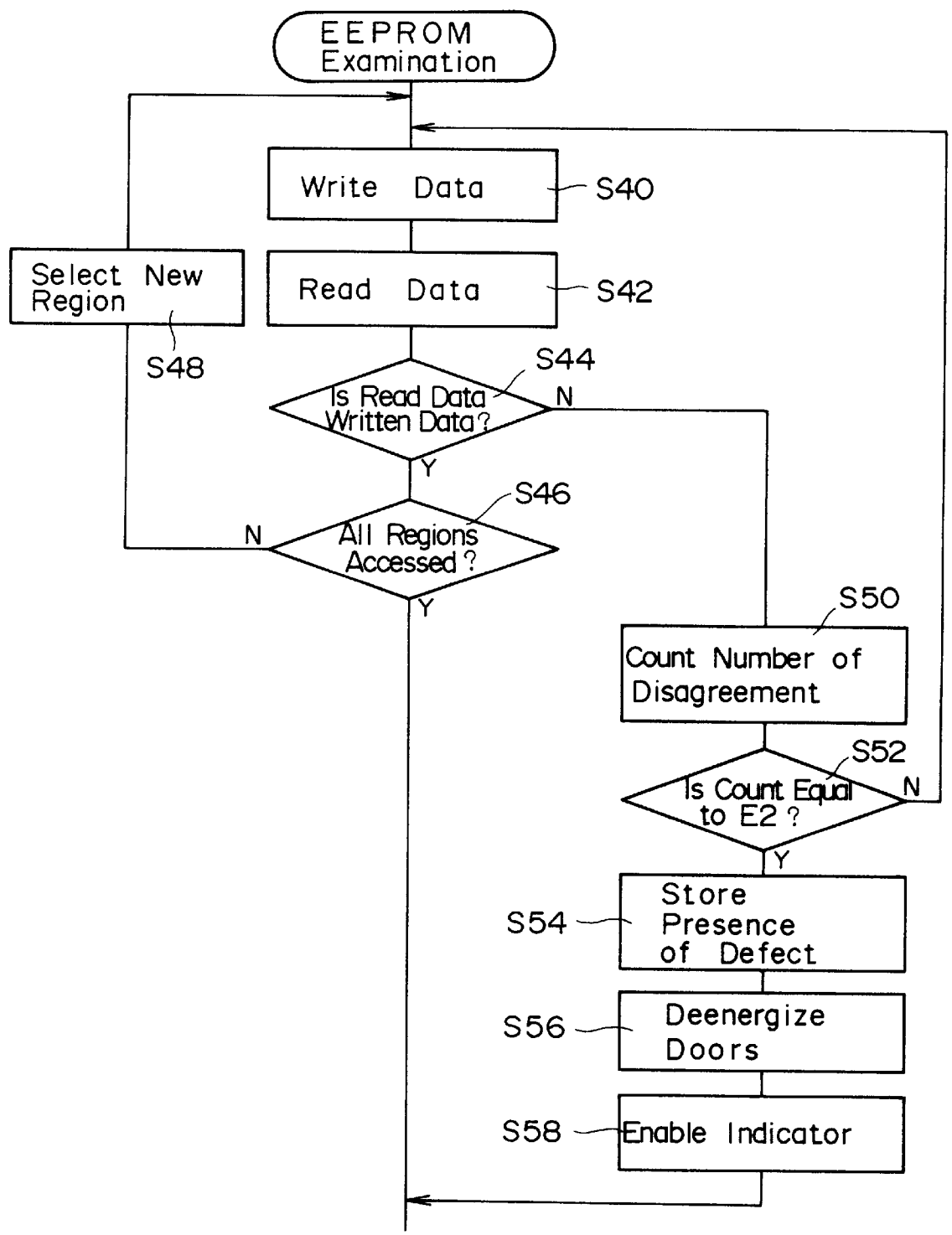
F I G . 5

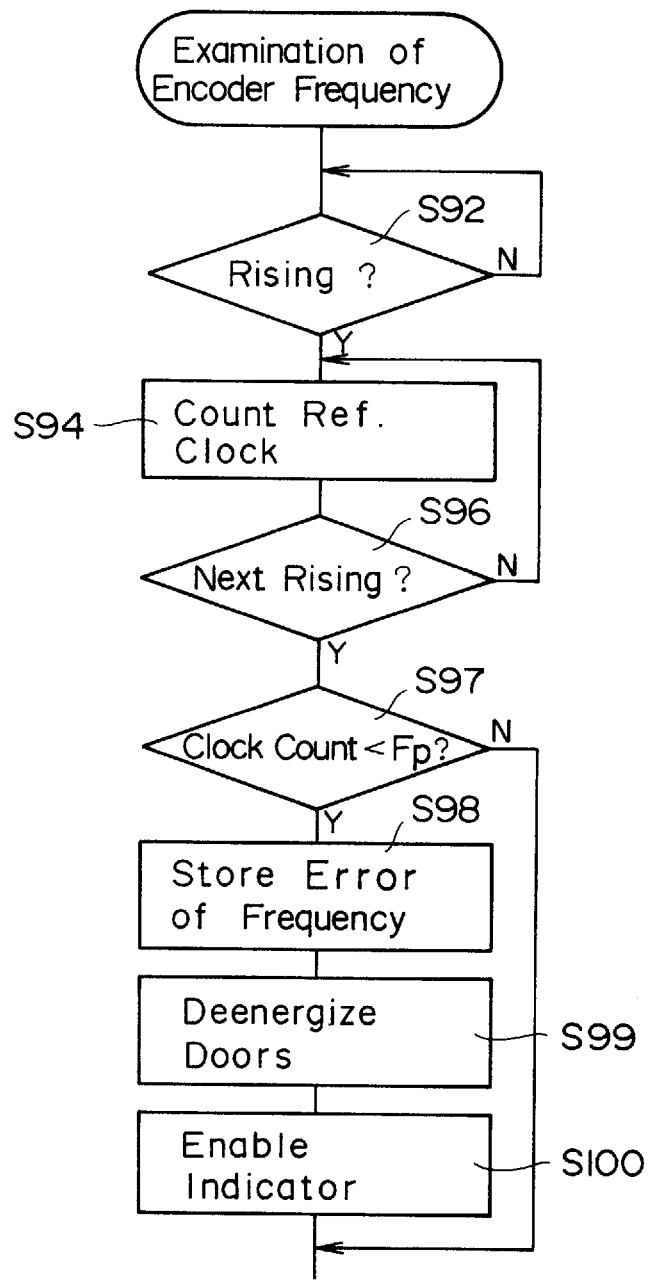
F I G. 10

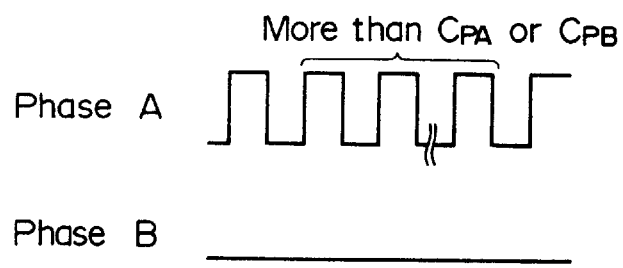
F I G . 12
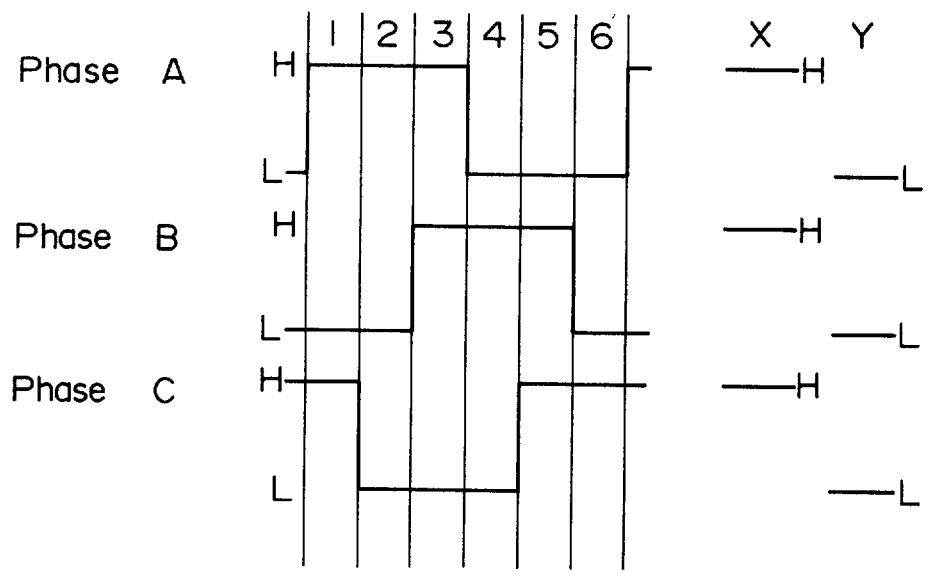
F I G . 14

| | |
|---|---|
| Control Section Fails | 1996.04.21 09:25 |
|   RAM | 1996.06.03 11:13 |
|   ROM | 1996.05.01 10:20 |
|   EEPROM | 1996.04.21 09:25 |
|   CPU Disorder | 1996.04.29 19:45 |
| | |
| Motor Fails | 1996.04.11 08:35 |
|   Encoder Signal | 1996.05.03 21:33 |
|   Encoder Frequency | 1996.05.01 07:20 |
|   Motor Current | 1996.04.11 08:35 |
|   Motor Temperature | 1996.04.29 09:55 |
| | |
| Sensor Fails | 1996.05.01 13:35 |
|   Sensor 24A (2) | 1996.05.05 22:01 |
|   Sensor 24B (1) | 1996.05.01 13:35 |

F I G . 28

AUTOMATIC DOOR SYSTEM WITH SELF-DIAGNOSING FUNCTION

This application is based on Japanese Patent Application No. HEI 8-147949 filed on May 17, 1996 entitled "Self-Diagnosing Apparatus for Automatic Door System" and Japanese Patent Application No. HEI 9-22915 filed on Apr. 24, 1997 entitled "Self-diagnosing Apparatus for Automatic Door System" claiming a Japanese domestic priority from the former Japanese patent application, the contents of which are incorporated herein by reference.

This invention relates to an automatic door system and, more particularly, to an automatic door system having a self-diagnosing function with which the automatic door system itself can detect its failure or malfunction.

BACKGROUND OF THE INVENTION

An automatic door system includes a door for closing and opening a doorway. The door is driven by a motor which is controlled by a control unit to drive the door to open when a sensor system associated with the door system senses an object approaching the door. The motor is also controlled to close the door when the sensor system senses the leaving of the object from the door.

An automatic door system includes various constituent devices including a door, a motor, a sensor system, and a control unit. Each of these constituent devices is formed of various components. After a long use of the door system, the constituents and their components may have been degraded, and the environment of the door system may have changed. As a result, the door may not open or close in a normal way, or may not open or close at all. A repairman, then, has to inspect the door system to find defective devices or components and replace them with new ones, or return the environment of the door system to the original environment as much as possible.

Japanese Unexamined Patent Publication (KOKAI) No. HEI 4-203187 discloses a technique in which data relating to the state of a door system is derived and stored in a non-volatile memory, and the stored data in the non-volatile memory is displayed on a display. From the information displayed on the display, the repairman can gather information as to what devices or components cause the failure of the door system.

However, the information displayed on the display in Japanese Unexamined Patent Publication (KOKAI) No. HEI 4-203187 is information relating to the door operating state, and it is not direct indication of devices and components causing the failure or malfunction, nor it directly indicates if a change in the environment of the door system is a cause of the malfunction of the door. The repairman can only guess the cause for the failure of the door from the display and, therefore, he has to inspect the system to find out the actual cause. Accordingly, it requires a long time for the door system to be repaired.

Even if the repairman can find some device to be the cause for the failure or malfunction, he may not be able to find what component of the device does not operate properly. In such a case, he will replace the device with a new one, and then send the removed device to the manufacturer. The manufacturer, then, will inspect the device to find out defective component, but it will take a relatively long time even for the manufacturer to find and replace the defective component.

Japanese Unexamined UM Publication (KOKAI) No. SHO 63-83384 discloses an automatic door system which includes a failure detecting apparatus which can detect failure or malfunction of a door, and if the door system is found to fail or malfunction, the information is sent to a maintenance man or company via a modem and a telephone line. The technique disclosed in this UM Publication, too, can find only events of a door, such as failure of the door in opening or closing. Accordingly, it is accompanied by the same type of problems discussed above.

An object of the present invention is to provide an automatic door system with self-diagnosing function, which can find for itself failure or malfunction of a respective one of constituent devices or components of a door system, so that door repairing efficiency can be improved.

In some cases, failure or malfunction of door may not continue, but may occur only when particular conditions are met. For instance, disturbance light may be incident on an optical object sensor at a particular time of day on a particular day, and such disturbance light may cause the door system to fail to operate properly. In such a case, replacement of a sensor cannot remove malfunction of the door. It may be possible, therefore, to determine the particular conditions to be met for the malfunction, by knowing the time of day and the date when the malfunction or failure of the door occurs.

Therefore another object of the present invention is to provide an automatic door system with self-diagnosing function, which can find for itself failure or malfunction of a respective one of constituent devices or components, and can store the time when such failure occurs, to facilitate determination of particular causes for the failure or malfunction, whereby door repairing efficiency is improved.

If the automatic door system is let to continue operating even when failure or malfunction occurs, such failure or malfunction may become more serious, which requires repairs to a larger extent.

A still further object of the present invention is to provide an automatic door system with self-diagnosing function, which can prevent failure or malfunction from becoming worse.

SUMMARY OF THE INVENTION

According to a first feature of the present invention, an automatic door system includes a driving apparatus which drives a door to open and close. The driving apparatus includes a motor. The automatic door system also includes a sensor for sensing an object approaching to or leaving the door, and a control unit including a control section for controlling the motor in accordance with a signal provided by the sensor. The control section includes failure or malfunction detecting means (hereinafter sometimes referred to simply as failure detecting means) which examines the motor, the sensor and the control section, and also a memory section for failure or malfunction (hereinafter sometimes referred to simply as failure). The memory section stores the result of examination made by the failure detecting means. The system further includes an output unit to which the detection result stored in the memory section is outputted.

With the arrangement according to the first feature, the result of detection of failure or malfunction, if any, of the constituent devices of the automatic door system, such as the motor, the sensor and the control unit, is outputted to the output unit, and, accordingly, a maintenance man can know what device fails to operate properly. Then, he can concentrate his inspection onto that device, which enables repairs of the door system in a short time.

According to a first aspect of the invention according to the first feature, the control section includes a RAM into and from which data for controlling the motor which drives the door is written and read, a ROM in which program for controlling the door is stored, and an EEPROM into and from which operating parameters of the door are written and read. The failure detecting means examines the RAM, the ROM and the EEPROM in the named order.

With the arrangement according to the first aspect, the control section uses a RAM, a ROM and an EEPROM in controlling the motor. The failure detecting means examines the RAM, the ROM and the EEPROM. The most important one of these components is the ROM in which the door controlling program are stored. However, for the detection of failure or malfunction of the ROM and the EEPROM, the RAM is indispensable. Accordingly, if the RAM itself has a defect, the result of examination of the ROM and the EEPROM cannot be reliable. Accordingly, the failure detection means first examines the RAM for failure or malfunction, and, if the RAM is determined normal, the most important ROM is next examined. If the ROM is also normal, the EEPROM is examined. Thus, the precision of examination of the ROM and the EEPROM is improved.

According to a second aspect, the automatic door system includes an EEPROM into and from which various data including operating parameters of the door is written and read, and the EEPROM is examined each time data is written into the EEPROM.

With the arrangement according to the second aspect, the operating parameters of the door which are important for the control of the door are written into an EEPROM. The operating parameters are read out from the EEPROM when the door operation is to be initiated. The door parameters may be altered when the environment of the door system changes. For instance, the door parameters may be changed in accordance with changes of the amount of passengers. Accordingly, the operating parameters stored in the EEPROM must be replaced by the new operating parameters. If such replacement is not properly done, the door may not operate properly. Therefore, each time when data is written into the EEPROM, the EEPROM is examined as to whether data has been properly written to ensure the proper operation of the door.

According to a third aspect, the failure detecting means determines whether the control section is out of order or not, upon the resetting of the control section, by judging whether the resetting of the control section is due to disorderly execution of the door control program or due to the power-on of the control section.

With the arrangement according to the third aspect, if noise, for example, causes the door control program to be executed in disorder, the control section is reset to start the control program from the beginning, again. Also, when power is applied to the control section, the control section is reset so that the control program is started from the beginning. Thus, simple detection of the resetting of control section is not enough to detect failure or malfunction of the control section. Accordingly, the failure detection means must determine which has reset the control section in order to detect failure or malfunction of the control section, disorderly execution of the door control program or the power-on of the control section. Separate reset trigger means may be used for resetting the control section when power is supplied to it and for resetting the control section when the door control program is executed in disorder, which enables quick judgment of the cause for the resetting of the control section.

According to a fourth aspect, the failure detecting means computes a current running resistance of the door on the basis of the rotation rate of the motor and the voltage supplied to the motor, and determines that the door fails or malfunctions when the difference between the current door running resistance and the running resistance of the door system when it was first installed, exceeds a predetermined value.

The running resistance of a door of an automatic door system changes from a value when the door system is installed to a different value as a result of the use of the door system. If no measure is taken, the door will not be able to move at a desired speed, or the motor will be overloaded in order to move the door at the desired speed, which will cause damage to the motor. The running resistance can be calculated by the rotation rate of the motor and the voltage applied to the motor. For example, if the motor is controlled to rotate at a constant rate, the voltage supplied to the motor will change when the running resistance of the door changes. On the other hand, if the supply voltage to the motor is controlled to become constant, the rotation rate of the motor will change. Therefore, the running resistance of the door, e.g. the supply voltage or rotation rate of the motor, which can represents the running resistance, may be stored in the memory section together with the running resistance the door exhibited when the door system was first installed, and determination of failure or malfunction may be made when the difference between the two running resistances exceeds a predetermined value, whereby the determination of the cause for the increase of the door running resistance, e.g. degradation of the motor or increase of the friction between the door and the surface on which the door is installed, is facilitated to thereby expedite the repairs of the door system.

According to a fifth aspect, the motor includes a motor rotation detecting section which develops a pulse signal representative of the rotation rate of the motor. The failure detecting means determines that the motor rotation detecting section fails or malfunctions when the number of reference clock pulses counted in one period of the pulse signal from the motor rotation detecting section becomes less than a predetermined value.

The motor rotation detecting section detects the rotation rate of the motor which relates to the door speed and develops a rotation rate representative pulse signal, and the detected rotation rate of the motor is used by the control section for controlling the door speed etc. The number of reference clock pulses generated by a reference clock pulse generator in one cycle of the motor rotation rate representative pulse signal generated by the motor rotation detecting section is counted by the failure detecting means to determine the speed of the door. If the number of reference clock pulses counted is smaller than a predetermined value, e.g. the number of reference clock pulses, which the failure detecting means would count in one period of the rotation rate representative pulse signal in the normal operating condition of the door, it may be determined that the motor rotation detecting section is out of order or noise intrudes into a transmission line between the motor rotation detecting section and the control section. Then, the maintenance man can immediately determine that what is to be inspected is the motor rotation detecting section or the transmission line, which enables quick and exact repairs.

According to a sixth aspect, the motor includes a motor rotation detecting section which develops two pulse signals each representing the rotation rate of the motor. The two pulse signals have different phases. The failure detection means determines that the rotation detecting section fails or malfunctions when no pulse change or transition between levels occurs in one of the two pulse signals during a time period in which the other pulse signal exhibits a predetermined number of changes.

In order for the control section to be able to control the door, it must know the direction in which the door is moving. For that purpose, the motor rotation detecting section develops, for example, two pulse signals which have different phases. The control section detects the first occurring one of the two pulse signals to determine the direction of the movement of the door. Both of the two pulse signals exhibit changes, e.g. rising edges and falling edges. Accordingly, if one of the two pulse signals does not exhibit any change during a time period in which the other exhibits a predetermined number of changes, e.g. during a time period in which the other pulse signal rises, falls and then rises again, in other words, in one period of the pulse signal, it may be determined that the motor rotation detecting section is not operating properly, or that the signal line connecting the motor rotation detecting section and the control section is broken. Then, the maintenance man can concentrate his inspection only on the motor rotation detecting section and the signal line, which enables quick recovery of the door system. The predetermined number of changes in one of the two pulse signals may be the number of changes in a plurality of periods of the pulse signals.

According to a seventh aspect, the motor includes a motor rotation detecting section which develops three pulse signals each representing the rotation rate of the motor. The three pulse signals have different phases. The failure detecting means determines that the rotation detecting section fails or malfunctions when no change occur in any one of the three pulse signals in one period of the pulse signals.

With the arrangement according to the seventh aspect, the motor rotation detecting section may generate three pulse signals having different phases, for example. Normally, each of the three pulse signals includes changes, e.g. risings and failings. Therefore, if none of the three pulse signals exhibit any changes, it can be determined that the motor rotation detecting section is not operating or is not operating properly, or that the signal line connecting the motor rotation detecting section to the control section is broken.

Then, the maintenance man can concentrate his inspection only on the motor rotation detecting section and the signal line, which enables quick repairs.

According to an eighth aspect, a sensor includes means for developing a failure or malfunction indicative pulse signal (hereinafter referred to simply as failure indicative pulse signal) when the sensor does not operate or operates improperly. The failure detecting means detects the presence of the failure indicative pulse signal and judges that the sensor is out of order.

If the sensor does not operate properly, the failure indicative pulse signal is applied to the failure detecting means, which enables quick repairs or replacement of the sensor.

According to a ninth aspect, the sensor includes means for developing different types of failure indicative pulse signal which indicates whether the failure requires repairs or replacement of the sensor. Thus, the failure detecting section can judge the type of the failure indicative pulse signal to determine which of repairs and replacement of the sensor is required.

With the arrangement according to the ninth aspect, the failure detecting section can determine which the detected failure or malfunction requires, repairs or replacement. Accordingly, if the sensor must be replaced, the maintenance man can replace the sensor by a new one without wasting time by unnecessary inspection of the sensor.

According to a tenth aspect, the motor includes a motor current monitoring section for monitoring current flowing through the motor, and the failure detecting means judges that the motor is out of order when the value of current monitored by the motor current monitoring section is above a predetermined value.

If the motor is operating properly, the value of current flowing through the motor never exceeds a predetermined value. Accordingly, if the motor current monitoring section indicates that the current in the motor exceeds the predetermined value, it can be judged that the motor, in particular, motor coils are broken. Thus, failure or malfunction of the motor, in particular, motor coils can be quickly detected, which enables quick repairs or replacement of the motor.

According to an eleventh aspect of the invention according to the first feature, the motor includes a motor temperature monitoring section which monitors the temperature of the motor. The failure detecting means judges that the motor is out of order when the motor temperature monitoring section indicates that the temperature of the motor exceeds a predetermined temperature.

Each time the door is opened or closed, the motor is driven, and, therefore, the temperature of the motor increases. When the motor is operating properly, the temperature never goes above a predetermined temperature. Accordingly, if the motor temperature monitoring section indicates that the temperature of the motor exceeds the predetermined value, it can be judged that excessive current is flowing in the motor.

According to a twelfth aspect, the motor includes a motor rotation detecting section which develops a pulse signal representing the rotation rate of the motor. If the number of pulses in the pulse signals which have been developed in the time period from the time the door leaves its fully closed or fully opened position to the time the door reaches the fully opened or fully closed position is greater than a predetermined number, an arrangement for transmitting the driving force of the motor to the door is judged to be operating improperly.

A driving unit including the motor includes also an arrangement for transmitting the driving force from the motor to the door. If the driving force transmitting arrangement is operating properly, the motor rotation detecting section develops a predetermined number of pulses in the time period during which the door moves from or to the fully opened position to or from the fully closed position. Therefore, if the number of pulses actually developed during the time period between the time the door starts moving from the fully closed position or from the fully opened position and the time the door reaches the fully opened position or the fully closed position is greater than the predetermined number, it may be immediately judged that the driving force transmitting arrangement is out of order.

According to a thirteenth aspect, the motor includes a motor rotation detecting section which develops a pulse signal representative of the rotation rate of the motor. When the ratio of the number of the reference clock pulses generated during a time period between a rising edge and a falling edge in one cycle of a pulse of the pulse signal developed by the motor rotation detecting section, to the number of the reference clock pulses generated during a time period between the falling edge and the next rising edge is out of a predetermined range of ratios, the failure detecting means judges that the motor is out of order.

The motor rotation detecting section may detect the rotation rate of a permanent magnet of the motor and develop the pulse signal representative of the rotation rate of the magnet. If the magnetic force of the permanent magnet changes, the ratio of the number of the reference clock pulses occurring in a time interval of from a rising edge to a falling edge in one cycle of the motor rotation rate representative pulse signal, to the number of the reference clock pulses occurring in a time period of from the falling edge to the next rising edge will be out of a predetermined range. Accordingly, by determining whether the ratio is within the predetermined range or not, it can be determined whether the motor is properly operating or not, which enables quick repairs of the door system.

According to a fourteenth aspect of the invention according to the first feature, the control section includes re-opening means for moving the door back to the fully opened position when the door is closing. When the door happens to be re-opened more than a predetermined number of times, the failure detecting means judges that there is a trouble in the door system.

With the arrangement according to the fourteenth aspect, the control section includes means for re-opening the door when the door contacts an article during its closing operation. More than a predetermined number of the re-opening of the door implies that there is an article in the path along which the door moves and the door has contacted the article during its closing operation. Then, the maintenance man can inspect the door and its environment to find failure or malfunction of the door.

According to a second feature of the invention, an automatic door system includes a door, a motor for driving the door to open and close, a control unit for controlling the motor, and a sensor for sensing an object approaching and leaving the door. The control unit includes a control section which controls the motor in accordance with a signal provided by the sensor. The control section includes failure detecting means for detecting failure or malfunction of the motor, the sensor, the control section itself, and a memory section storing the result of the detection by the failure detecting means. If the detected failure or malfunction is fatal to the driving of the door, the failure detecting means causes the driving of the door to be interrupted.

With the arrangement of the second feature of the invention, when devices or components which are important to the driving of the door are judged not to be operating or not operating properly, the door would be damaged or collide with the article if no measure against such failure or malfunction is taken. Accordingly, if the failure detecting means detects failure or malfunction of such important portions, the driving of the door is stopped to thereby secure the safety of the article and also to secure the door from being damaged.

According to a third feature of the invention, an automatic door system includes a door, a motor for driving the door to open and close, a control unit for controlling the motor, and a sensor for sensing an object approaching and leaving the door. The control unit includes a control section which controls the motor in accordance with a signal provided by the sensor. The control section includes failure detecting means for detecting failure or malfunction of the motor, the sensor, the control section itself, and a memory section storing the result of the detection by the failure detecting means. When the failure detecting means detects failure or malfunction in the door system, it causes the door to be operated with limited operating parameters.

With the arrangement of the third feature of the invention, when failure or malfunction is detected, the door is operated with operating parameters limited relative to the ones in the normal door operation, and, therefore, the door is operated without overloading a malfunctioning device or component. Thus, the door can be operated to open and close, while the failure or malfunction of the device or component is prevented from becoming worse.

According to a fourth feature of the invention, an automatic door system includes a door, a motor for driving the door to open and close, a control unit for controlling the motor, and a sensor for sensing an object approaching and leaving the door. The control unit includes a control section which controls the motor in accordance with a signal provided by the sensor. The control section includes failure detecting means for detecting failure or malfunction of the motor, the sensor, the control section itself, and a memory section storing the result of the detection by the failure detecting means. An output unit outputs an indication of actions for identifying the cause of the failure or malfunction on the basis of the result of detection stored in the memory section.

With the arrangement of the fourth feature, if, for example, the motor is judged not to be operating or not to be operating properly, the output unit outputs an indication of actions to be taken for identifying the cause of the failure or malfunction of the motor. Because the indicated actions are concrete steps to be taken, the maintenance man can follow the indicated steps to quickly and correctly find the cause of the failure or malfunction.

According to a fifth feature of the invention, an automatic door system includes a door, a motor for driving the door to open and close, a control unit for controlling the motor, and a sensor for sensing an object approaching and leaving the door. The control unit includes a control section which controls the motor in accordance with a signal provided by the sensor. The control section includes failure detecting means for detecting failure or malfunction of the motor, the sensor, the control section itself, and a memory section storing the result of the detection by the failure detecting means. An output unit outputs an indication of the occurrence of failure or malfunction and the time of day and the date of occurrence of the failure or malfunction.

With the arrangement according to the fifth feature, the detection of failure or malfunction and the time of day and the date of occurrence of the detected failure or malfunction are stored in the memory section. For example, if a device which was replaced because of the detection of failure continues to fail to operate or to malfunction, the maintenance man can know the time of day and the date of occurrence of such failure or malfunction and, therefore, can be at the site of the door system at the same time of day and see the failure or malfunction with his eyes. Accordingly, it is easier for the maintenance man to identify the external disturbance which causes the failure or malfunction.

BRIEF DESCRIPTION OF THE DRAWINGS

FIG. 1 is a block diagram of an automatic door system with self-diagnosing function according to one embodiment of the present invention.

FIG. 2 is a flow chart for detecting failure or malfunction of a memory of the system of FIG. 1 done immediately after the system is powered on.

FIG. 5 is a flow chart for detecting failure or malfunction of an EEPROM of the system of FIG. 1.

FIG. 10 is a flow chart for examining an encoder frequency in the system of FIG. 1.

FIG. 12 shows two-phase signals having different phases developed by the encoder used in the system of FIG. 1.

FIG. 14 shows three-phase signals at different phases developed by a different type of the encoder which may be used in the system of FIG. 1.

FIG. 28 shows a display of malfunction of the system of FIG. 1 on a personal computer.

DETAILED DESCRIPTION OF THE INVENTION

Structure of Automatic Door System

Figure 2:
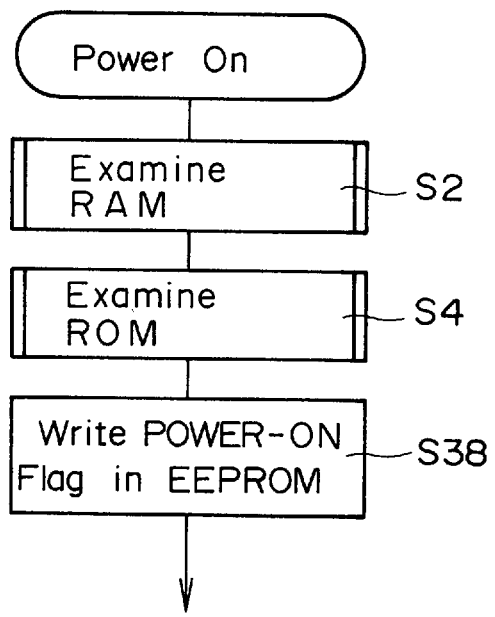

As shown in FIG. 1, an automatic door system according to the present invention includes doors 2a and 2b which open and close a doorway (not shown) in a building. The automatic door system also includes a driving unit 1 which, in turn, includes a driving force transmitting arrangement 4 and a motor 6. The motor 6 may be a DC motor or a three-phase brushless motor. The driving force transmitting arrangement 4 includes pulleys 4a and 4b disposed above the doors 2a and 2b and spaced from each other. A belt 4c is looped around the pulleys 4a and 4b. The door 2a is secured to the upper portion of the loop, and the door 2b is secured to the lower portion of the loop. The pulley 4a is connected to the motor 6. The rotation of the motor 6 in one direction causes the doors 2a and 2b to move in the respective directions indicated by arrows so that the doorway is opened. The rotation of the motor 6 in the other direction causes the doors 2a and 2b to move in the directions opposite to the directions indicated by the arrows, whereby the doorway is closed. The doors 2a and 2b are sliding doors. Although not shown, the doors 2a and 2b move on guide rails disposed on a floor. It should be noted that the present invention is also applicable to other types of doors, such as a single sliding door and swing doors.

The motor 6 is connected to a drive unit 8. The drive unit 8 includes a bridge circuit formed of semiconductor switches, e.g. FET's. The FET's are controlled to be conductive and nonconductive in response to a PWM signal and a direction control signal supplied thereto from a later-mentioned control section 10 via an input/output (I/O) interface 9. Thus, the drive unit 8 controls the polarity and magnitude of a DC voltage applied to the motor 6 from a DC power supply (not shown). The direction control signal alters the polarity of the DC voltage applied to the motor 6 to thereby alter the direction of rotation of the motor 6, which, in turn, changes the directions of movement of the doors 2a and 2b. The PWM signal changes the average magnitude of the voltage applied to the motor 6 to thereby change the rotation rate of the motor 6, which, in turn, changes the speed of movement of the doors 2a and 2b.

The automatic door system further includes a control unit 3 which includes the above-mentioned control section 10. The control section 10 includes a CPU 12, a non-volatile memory, e.g. a ROM 14, a volatile memory, e.g. as RAM 16, and a non-volatile writable memory, e.g. an EEPROM 18. The control section 10 includes also a reference clock signal generating circuit 20 which generates a reference clock signal for use in operating the CPU 12, the ROM 14, the RAM 16, and the EEPROM 18. The CPU 12 achieves processing in accordance with control programs stored in the ROM 14 for, for example, controlling the operation of the doors 2a and 2b and for examining units and components of the system to detect failure or malfunction. The RAM 16 temporarily stores data for use in such processing. The EEPROM 18 stores various operating parameters for use in controlling the operation of the doors 2a and 2b and also data for use in failure detection which will be described later. The stored parameters include, for example, the initial speed of the doors 2a and 2b when they starts opening and the final speed of the doors when they are reaching their fully opened positions. Another example of the operating parameters is an open-time period, which is a time period disposed between the time when an object sensed by a sensor of the door system to cause the door to be opened, comes to be sensed no longer and the time the doors 2a and 2b start closing.

In order for the CPU 12 to be able to control the movement of the doors 2a and 2b, it must know the directions of the movement of the doors 2a and 2b, e.g. whether the doors are moving in the closing directions or in the opening directions, as well as the speed of the doors 2a and 2b. To provide such information, a motor rotation detecting section, e.g. an encoder 22, is coupled to the rotating shaft of the motor 6. Signals from the encoder 22 are coupled to the CPU 12 via an I/O interface 23. Although not shown, power for driving the encoder 22 is supplied from the control unit 3. When the motor 6 is a DC motor, the encoder 22 provides two-phase pulse signals. If a three-phase brushless motor is used, an encoder which provides three-phase pulse signals is used as the encoder 22.

In order for the CPU 12 to be able to control the doors 2a and 2b, it must know whether an object, e.g. a human who is going to pass through the doorway, is approaching or leaving the doors 2a and 2b. In order to provide such information to the CPU 12, a sensor 24A is disposed to detect the presence of a human in a predetermined area which is outside the building and near the doors 2a and 2b. Also, a sensor 24B is disposed to detect the presence of a human in a predetermined area which is inside the building and near the doors 2a and 2b. The door system further includes a sensor 24C for detecting a human who is standing very closely to the doors 2a and 2b inside the building. Each of the sensors 24A, 24B and 24C may be an optical sensor which includes light-emitters and light-receivers. Signals from the sensors 24A, 24B and 24C are coupled to the CPU 12 via I/O interfaces 26A, 26B and 26C, respectively.

Let it be assumed that the sensor 24A senses an object when the doors 2a and 2b are closed. In this case, the CPU 12 provides a direction control signal to cause the doors 2a and 2b to be opened and also a PWM signal for controlling the speed of the doors 2a and 2b.

The speed of the doors 2a and 2b is controlled over the following four regions. In a region in which the doors 2a and 2b starts opening, a PWM signal having a duty ratio gradually increasing at a predetermined rate is applied so that the door speed increases. This region is called accelerating region. Then, the doors 2a and 2b reach a predetermined high speed, i.e. the doors enter a high-speed region.

The PWM signal is feed-back controlled so as to maintain the high speed the doors 2a and 2b has attained. Then, the doors approach a region near the fully opened positions, and the door speed is reduced in preparation for stopping the doors at their fully opened positions.

This regions is called decelerating region. When the speed of the doors 2a and 2b reaches a predetermined low speed, the doors are moved at the low speed to the fully opened positions. This region is called low-speed region. In this low-speed region, feedback control is achieved to keep the low speed.

For the feedback control, signals from the encoder 22 are used. When the open-time period passes from the time a passenger passes through the doorway and comes to be no longer sensed by the sensor 24B, the doors 2a and 2b are closed. Under the control of the CPU 12, the motor 6 maintains the doors 2a and 2b in contact with each other when they are in their fully closed positions, and also maintains the doors 2a and 2b in contact with the side edges of the doorway when the doors are in their fully opened positions.

The CPU 12 examines various portions of the door system to detect failure or malfunction of such portions in accordance with programs stored in the ROM 14.

The drive unit 8 includes a motor current monitoring section 28 which monitors current flowing in the motor 6 and provides the result of the monitoring, i.e. a motor-current representative signal to the CPU 12 via an I/O interface 9. A motor temperature monitoring section 30 is associated with the motor 6 for monitoring the temperature of the motor 6. A motor-temperature representative signal from the motor temperature monitoring section 30 is coupled to the CPU 12 via an I/O interface 32. The CPU 12 uses the motor-current representative signal and the motor-temperature representative signal to examine the motor with respect to its current and temperature.

The sensors 24A and 24B include means 27A and 27B, respectively, for detecting their own failure or malfunction, like the ones disclosed in U.S. patent application Ser. No. 08/ filed on Apr. 24, 1997, which correspond to Japanese Patent Applications No. HEI 8-130705, No. HEI 8-130686 and No. HEI 9-90356. The sensor failure detecting means 27A and 27B are so arranged that when they detect failure or malfunction of the sensors, they develop a pulse signal indicating that the sensors should be inspected or a pulse signal indicating that the sensors should be replaced. The pulse signal is superposed on a sensor signal which indicates the sensing of the presence and absence of an object. The sensor signals with the failure representative pulse signals superposed thereon are coupled to the CPU 12 via respective I/O interfaces 26A and 26B.

The CPU 12 is provided with a watch dog timer 34 which resets the CPU 12 when the operation of the CPU 12 is put into disorder due to, for example, disturbance noise. A program for causing a pulse signal to be applied to the watch dog timer 34 at predetermined time intervals is stored in a region of the ROM 14 from which data is read out by the CPU 12 if the CPU 12 is properly operating. If disturbance noise causes the CPU 12 to read data from other regions of the ROM 14, i.e. to operate in a disorderly manner, the pulse signal is not applied to the watch dog timer 34 at the predetermined time intervals, which causes the watch dog timer 34 to reset the CPU 12. Then, the disorderly operation of the CPU 12 is removed.

The CPU 12 is reset also when the automatic door system is powered on.

The two types of resetting of the CPU 12 are triggered in different ways. For example, the resetting of the CPU 12 by the watch dog timer 34 is carried out when a particular flag is set in the CPU 12. On the other hand, the resetting of the CPU 12 upon the power-on of the system is done in response to a signal applied to a particular terminal when the system is turned on.

Figure 7:
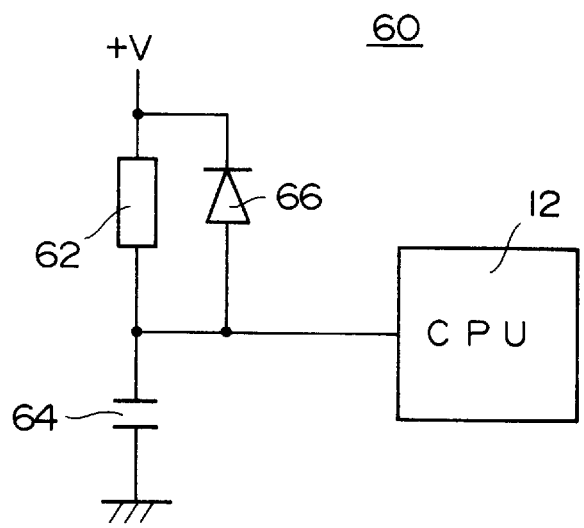
FIG. 7 is a block diagram of a current monitoring circuit of the system of FIG. 1.
Figure 8:
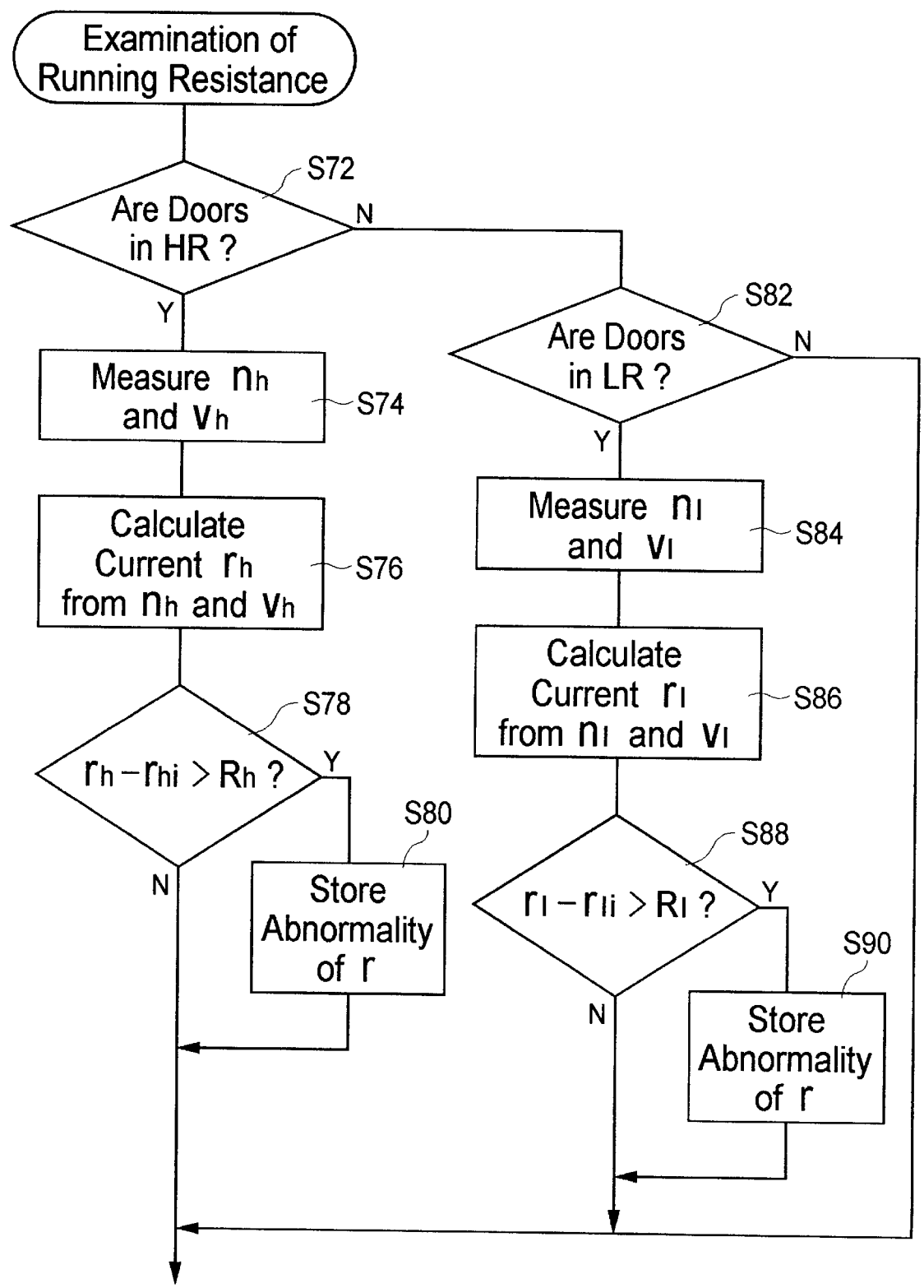
FIG. 8 is a flow chart for examining the running resistance of a door of the system of FIG. 1.

In order to detect the resetting of the CPU 12 due to the power-on of the automatic door system, a power supply monitoring circuit 60 is connected to the CPU 12. As shown in FIG. 7, the power supply monitoring circuit 60 includes a series combination of a resistor 62 and a capacitor 64 connected between the power supply for the system and the ground, with the terminal of the capacitor 64 remote from the resistor 62 grounded. The voltage developed across the capacitor 64 is applied to the CPU 12. A diode 66 is connected in parallel with the resistor 62. The diode 66 is used to make the charging and discharging time constants of the capacitor different from each other.

When the automatic door system is powered on, the charging of the capacitor 64 is started and the voltage across the capacitor 64 gradually increases. Then, the voltage becomes higher than a threshold level set between a high (H) level and a low (L) level. The CPU 12 is programmed to examine the voltage on the capacitor 64 a predetermined time after it is reset. This predetermined time is such that the voltage across the capacitor 64 does not exceed the threshold level in this predetermined time when the resetting takes place at the same time as the system is powered on. In case that the CPU 12 is reset due to its disorderly operation, the voltage across the capacitor 64 examined after the predetermined time from the time the CPU 12 is reset is above the threshold level because the CPU 12 was powered a long time before the resetting. Thus, by examining the voltage across the capacitor 64, the cause of the resetting of the CPU 12 can be identified.

Inspection for failure detection is also made with respect to the encoder 22, the ROM 14, the RAM 16, the EEPROM 18, and the running resistance of the doors 2a and 2b. Failure detection of the encoder 22 is made through examining the signals supplied from the encoder 22 to the CPU 12. Failure detection of the ROM 14, the RAM 16 and the EEPROM 18 are carried out by writing and reading particular data into and from them. The examination of the running resistance of the doors is carried out on the basis of the signals from the encoder 22.

An indicator 56 is used to indicate the result of the examination for failure detection. The CPU 12 supplies a signal to the indicator 56 via an I/O interface 58 to operate the indicator 56.

Failure Detection of ROM 14, RAM 16 and EEPROM 18

As shown in FIG. 2, immediately after the automatic door system is powered on, the ROM 14 and the RAM 16 are examined in the named order for failure detection. See Steps S2 and S4.

Figure 3:
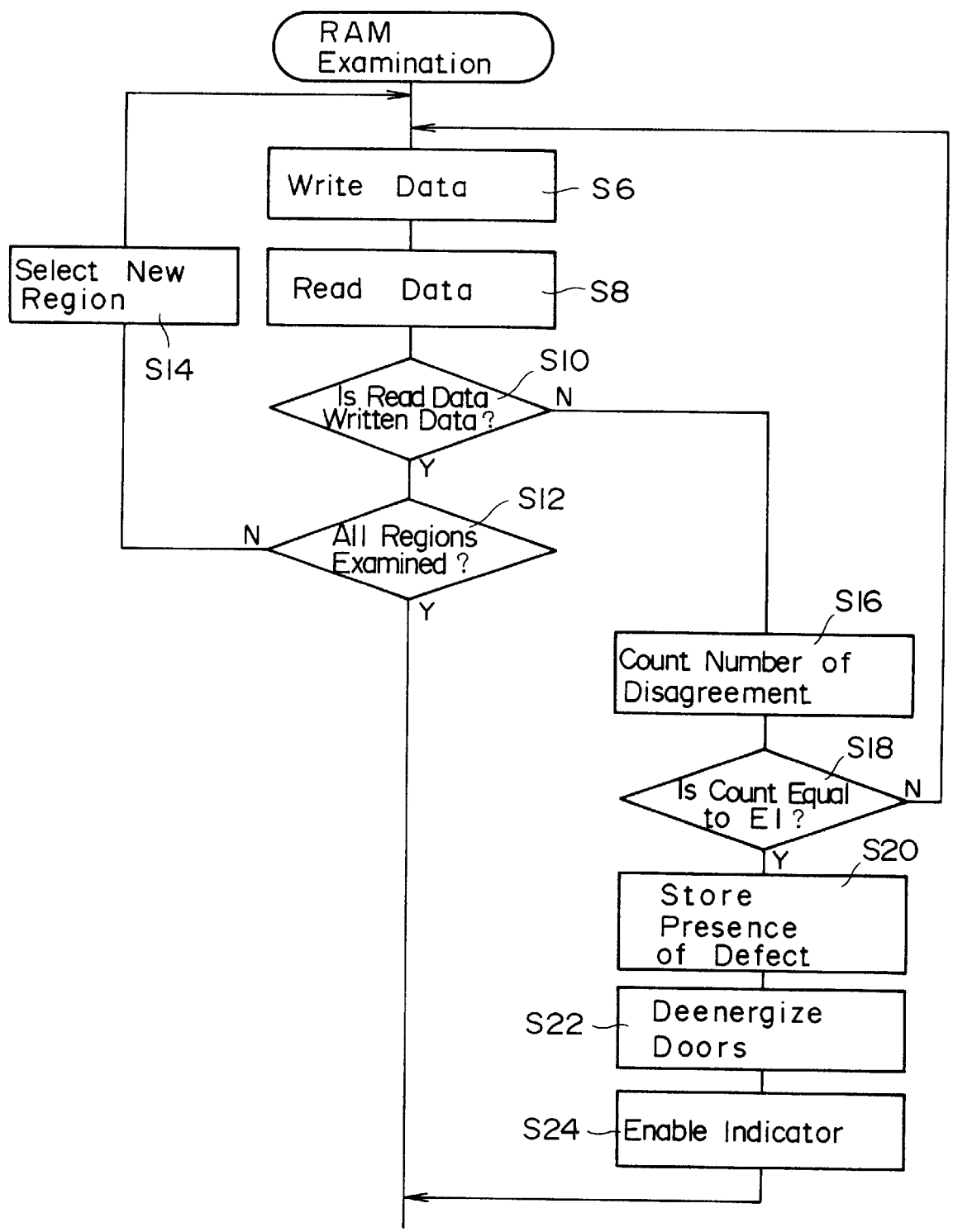
FIG. 3 is a flow chart for detecting failure or malfunction of a RAM of the system of FIG. 1.

The examination of the RAM 16 is done in a manner shown in FIG. 3. A first region of the RAM 16 is accessed to write certain data in it (Step S6). The written data is then read out (Step S8), and judgment is made as to whether the read data and the written data coincide (Step S10). If the answer to Step S10 is YES, judgment is made as to whether reading and writing of data and comparison of data have been done for all of the RAM regions (Step S12). If not, a next region to be accessed is specified (Step S14) and Step S6 is executed again. If the answer to Step S12 is YES, the ROM 14 is then examined.

If the data read out in Step S10 is not the same as the data written in, the number of occurrences of disagreement is counted in Step S10. Whether the count is equal to a predetermined number E1 or not is judged (Step S18), and if the judgment is NO, the processing returns to Step S6 to write data again. If the count counted in Step S16 is equal to the predetermined number E1, it is judged that the region of the RAM 16 contains a defect. Then, data indicating that the RAM 16 has a defect is stored in the EEPROM 18, together with the date and the time of day at which the defect is detected (Step S20). The date and the time of day are derived from a timing section (not shown). Then, the doors 2a and 2b are deenergized so that they can be moved manually (Step S22). At the same time, the FET's of the drive unit 8 are turned off so that the doors 2a and 2b can be moved by hand. The indicator 56 is intermittently turned on to indicate that the door system fails to operate properly (Step S24).

Figure 4:
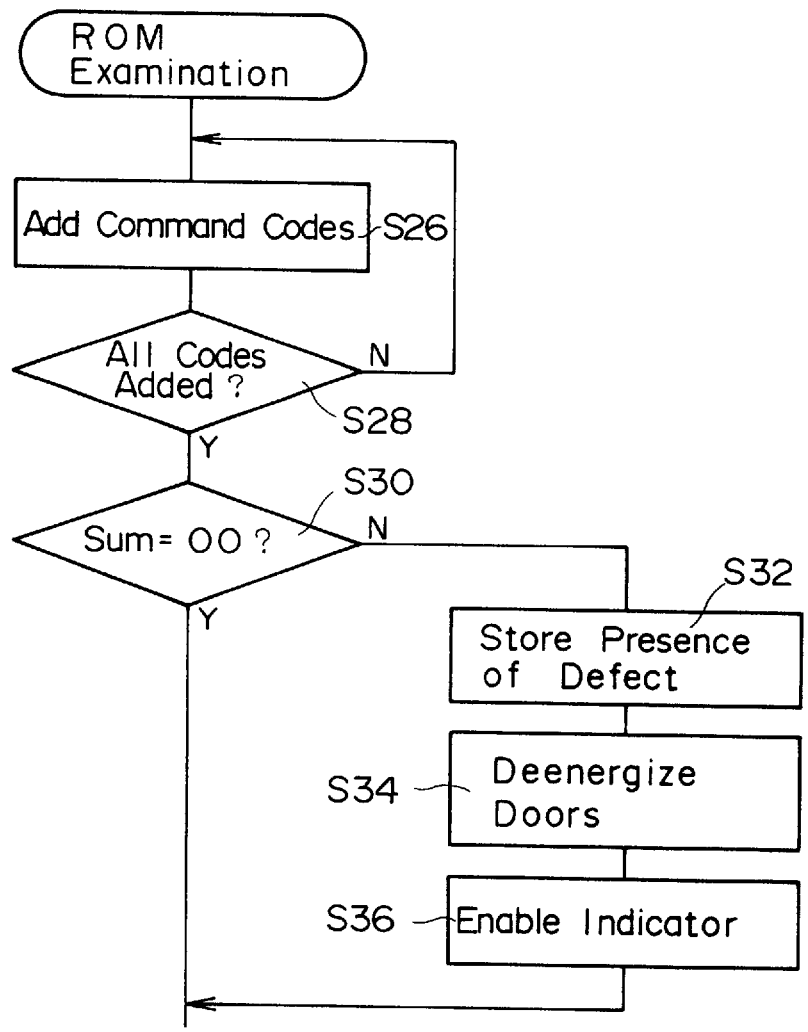
FIG. 4 is a flow chart for detecting failure or malfunction of a ROM of the system of FIG. 1.

If no failure or malfunction is detected in the RAM 16, failure detection of the ROM 14 is performed in a manner shown in FIG. 4. The ROM 14 contains a number of command codes written in binary number for, for example, controlling the doors 2a and 2b. In addition to the command codes, the ROM 14 contains an imaginary command code which does not participate in controlling the doors 2a and 2b. The imaginary command code is determined such that the least significant two bits of the sum of all of the command codes in the ROM 14 including the imaginary code are "00". Thus, the command codes are added (Steps S26 and S28), and a judgment as to whether the least significant two bits of the sum are "00" or not is made (Step S30). If they are not "00", the ROM 14 can be judged to be malfunctioning. Then, information indicating that the ROM 14 is malfunctioning is written in the EEPROM 18, together with the date and the time of day of occurrence of the malfunctioning (Step S32). Then, the doors are deenergized so that they can be moved manually (Step S34), and the indicator is enabled (Step S36).

When the ROM 14 is judged to be operating properly, then, a POWER-ON flag is written in the EEPROM 18 (Step S38) as shown in FIG. 2. When data is written into the EEPROM 18, the EEPROM 18 is examined for its failure or malfunction. Regions into which data are written are predetermined for respective data. Therefore, as shown in FIG. 5, particular data is written into a region assigned to it (Step S40). Then, the data written is read out, and judgment is made as to whether the data read out agrees with the data written in (Steps S42 and S44). If the data read out agrees with the data written in, judgment is made as to whether data to be written in have been all written or not, or, in other words, whether the regions to be accessed have been all accessed or not (Step S46). If all of the regions to be accessed have not yet been accessed, a new region to be accessed is selected (Step S48), and Step S40 is executed again.

If it is found that the data read out does not agree with the data written in, the number of occurrences of disagreement is counted (Step S50). Then, whether the count is equal to a predetermined number E2 or not is judged (Step S52). If not, the processing returns to Step S40, and data is written again. On the other hand, if the count is equal to the predetermined number E2, the region of the EEPROM 18 can be judged to be defective. Then, information indicating that the EEPROM 18 is malfunctioning is written in the RAM 16, together with the date and the time of day of occurrence of such malfunction (Step S54). Then, the doors are deenergized so that they can be manually moved (Step S56), and the indicator is enabled (Step S58).

Operating parameters stored in the EEPROM 18 may be altered by means of a Handy Terminal (HT) or hand-held computer 36. In such a case, too, the same processing is executed. That is, the examination of the EEPROM 18 is performed not only when the system is powered on, but also when data is written into the EEPROM 18.

The reason why the doors are deenergized when any of the RAM 16, the ROM 18 and the EEPROM 18 is judged to be defective is as follows. The RAM 16, the ROM 18 and the EEPROM 18 are used with the CPU 12 for controlling the doors 2a and 2b. Accordingly, if any of the RAM 16, the ROM 18 and the EEPROM 18 is defective, the doors 2a and 2b will not be able to operate properly, and the motor 6 and the driving force transmitting arrangement 4 could be damaged. In other words, the malfunction of the RAM 16, the ROM 18 or the EEPROM 18 can cause other devices and components to become defective. The reason why the doors 2a and 2b are deenergized when failure or malfunction is detected in other failure detection processing described below is the same as stated above.

The reason why the examination of the RAM 16 is carried out first is as follows. In order to carry out the addition of the command codes in the examination of the ROM 14, the RAM 16 is indispensable. Furthermore, data read out from the EEPROM 18 in the examination of the EEPROM 18 is temporarily stored in the RAM 16. In other words, the RAM 16 is indispensable to the examination of the ROM 14 and the EEPROM 18, and, therefore, only after the RAM 16 is judged to operate properly, judgment as to whether the ROM 14 and the EEPROM 18 are operating properly can be made. This is the reason why the RAM 16 is first examined.

In comparison with stored data in the EEPROM 18, data stored in the ROM 14 is more related to the control provided by the CPU 12 and, therefore, is more important. Accordingly, the examination of the ROM 14 is made prior to the examination of the EEPROM 18, after the RAM 16 is judged to be properly operating.

Disorderly Operation of CPU 12

Figure 6:
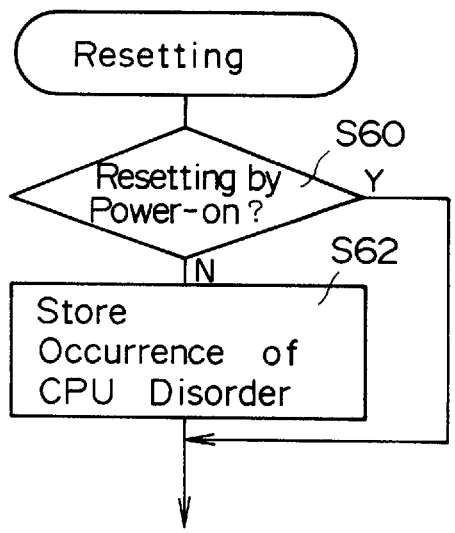
FIG. 6 is a flow chart for detecting random operation of a CPU of the system of FIG. 1.

When the CPU 12 operates in a disorderly manner, processing shown in FIG. 6 is executed. As described previously, if the CPU 12 operates in disorderly fashion, it is reset by the watch dog timer 34. The resetting of the CPU 12 due to its disorderly operation is different from the resetting done when the automatic door system is powered on. Therefore, when the CPU 12 is reset, judgment is made as to whether the resetting is caused by the power-on of the system or not (Step S60). Specifically, judgment is made as to whether the voltage across the capacitor 64 (FIG. 1) is lower than the threshold or not. If the resetting is judged to be caused not by the power-on of the system, information indicating that the CPU 12 has operated in a disorderly manner is written into the EEPROM 18, together with the date and the time of day of the occurrence (Step S62). The stored information about the disorderly operation of the CPU 12 is displayed on the Handy Terminal HT when it is connected to the control section 10 (FIG. 1), as described later.

If the record of disorderly operation of the CPU 12 is stored, it is possible to assume the control section of the automatic door system is caused to operate in a disorderly fashion by noise, e.g. external electromagnetic waves. Therefore, it can provide information useful in determining what actions should be taken. For example, the control section 10 may be placed in a shield casing, so that undesired resetting of the CPU 12 can be prevented.

Alternatively, because the POWER-ON flag is written in the EEPROM 18 in Step S38 when the system is powered on, the judgment as to whether the resetting is caused by the power-on of the system or not can be made by examining if the flag has been set, instead of using the power supply monitoring circuit 60.

Examination of Door Running Resistance

Figure 9:
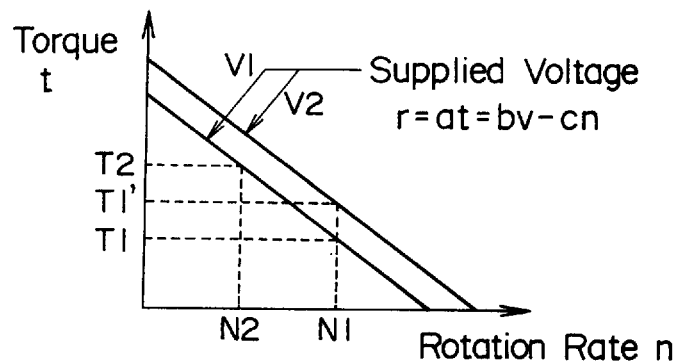
FIG. 9 shows a relationship between the rotation rate of a motor and a voltage supplied to the motor of the system of FIG. 1.

As shown in FIG. 9, the running resistance "r" of the doors 2a and 2b is expressed as r=at=bv−cn, where "a", "b" and "c" are constants, "t" is the torque generated by the motor 6, "v" is the voltage applied to the motor 6, and "n" is the rotation rate of the motor 6. The torque "t" is a function of the voltage applied to the motor 6 and the rotation rate of the motor 6. Let it be assumed, for example, that the torque generated by the motor 6 at a given door position of the doors 2a and 2b when the door system is first installed is T1, the rotation rate of the motor 6 which is required to provide the required speed to the doors 2a and 2b is N1, and the voltage applied to the motor 6 (the average of the voltage since the motor is PWM controlled) is V1. Also let it be assumed that because of use, the running resistance of the doors 2a and 2b has increased and, therefore, the torque has increased to T1'. If the rotation rate of the motor 6 is kept to be N1 by means of feedback control as in the illustrated embodiment, the voltage applied to the motor 6 increases to V2.

Then, by detecting changes of the voltage applied to the motor 6, the running resistance of the doors can be known. It should be noted, however, that the door speed is not constant throughout a given stroke, and the torque gradually increases in the accelerating region and gradually decreases in the decelerating region. The torque has respective constant values in the high and low speed regions. Therefore, the running resistance of the doors is measured in the high-speed and low speed regions.

Each time the doors 2a and 2b operate, judgment is made as to whether the doors are in the high-speed region (HR) or not (Step S72). This judgment can be done by judging whether the doors are moving at the speed for the high-speed region. If it is judged that the doors 2a and 2b are in the high-speed region, the rotation rate $n_h$ of the motor 6 and the voltage $v_h$ supplied to it are measured (Step S74). If the system employs feedback control as stated above, the voltage supplied to the motor 6 is measured on the basis of the duty ratio of the PWM signal supplied from the CPU 12 to the motor drive unit 8. As the voltage supplied to the motor 6 is high, the duty ratio increases. Then, the current door running resistance $r_h$ is calculated (Step S76). Next, judgment is made as to whether the difference between the calculated current running resistance $r_h$ and the running resistance $(r_{h,i})$ the doors had when the system was installed which is stored in the EEPROM 18 is greater than a predetermined value $(R_h)$ (Step S78). If the answer is YES, information indicating that the door running resistance is not appropriate is stored in the EEPROM 18 (Step S80). At the same time, the date and the time of day of the occurrence are also stored.

If it is judged in Step S72 that the doors 2a and 2b are not in the high-speed region, judgment as to whether they are in the low-speed region (LR) or not is made (Step S82). This judgment can be made by judging whether the speed of the doors 2a and 2b is the predetermined speed for the low-speed region. If it is judged that the doors 2a and 2b are in the low-speed region, the rotation rate n, of the motor 6 and the voltage $v_l$ supplied to it are measured (Step S84). If the system employs feedback control as stated above, the voltage supplied to the motor 6 is measured on the basis of the duty ratio of the PWM signal supplied from the CPU 12 to the motor drive unit 8. Then, the current door running resistance $r_l$ is calculated (Step S86). Next, judgment is made as to whether the difference between the calculated current running resistance $r_l$ and the running resistance $(r_{l,i})$ the doors had when the system was installed which is stored in the EEPROM 18 is greater than a predetermined value $(R_l$) (Step S88). If the answer is YES, information indicating that the door running resistance is not appropriate is stored in the EEPROM 18 (Step S90). At the same time, the date and the time of day of the occurrence are also stored.

The stored information is read out on the Handy Terminal HT for the maintenance purpose when the Handy Terminal is connected to the control section.

In the above-described example, because of the feedback control, changes of the door running resistance appear as changes of the voltage applied to the motor 6. If the voltage applied to the motor 6 is controlled to be constant, a change of the door running resistance appears as a change of the rotation rate of the motor 6 as indicated by N1 and N2 in FIG. 9. In this case, the current rotation rate of the motor 6 is determined, and if the difference between the determined current rotation rate and the rotation rate the motor 6 exhibited in the high-speed or low-speed region when the system was first installed exceeds a predetermined value, it may be judged that the running resistance of the doors is not appropriate.

The running resistance may be examined only in either of the high-speed region and the low-speed region.

The causes for inappropriate running resistance values may be, for example, failure or malfunction of the motor 6, erroneous connections to the motor 6, failure or malfunction of the control section 10, or failure or malfunction of the driving force transmitting arrangement 4. If the abnormality of the running resistance of the doors is indicated on the Handy Terminal HT, a maintenance man can inspect them one by one, so that repairs can be made quickly.

Failure Detection of Encoder

Figure 11:
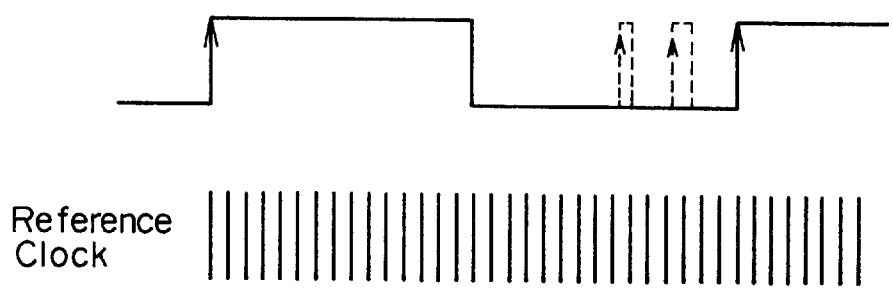
FIG. 11 shows a relationship between an encoder signal and a reference clock in the system of FIG. 1.
Figure 13:
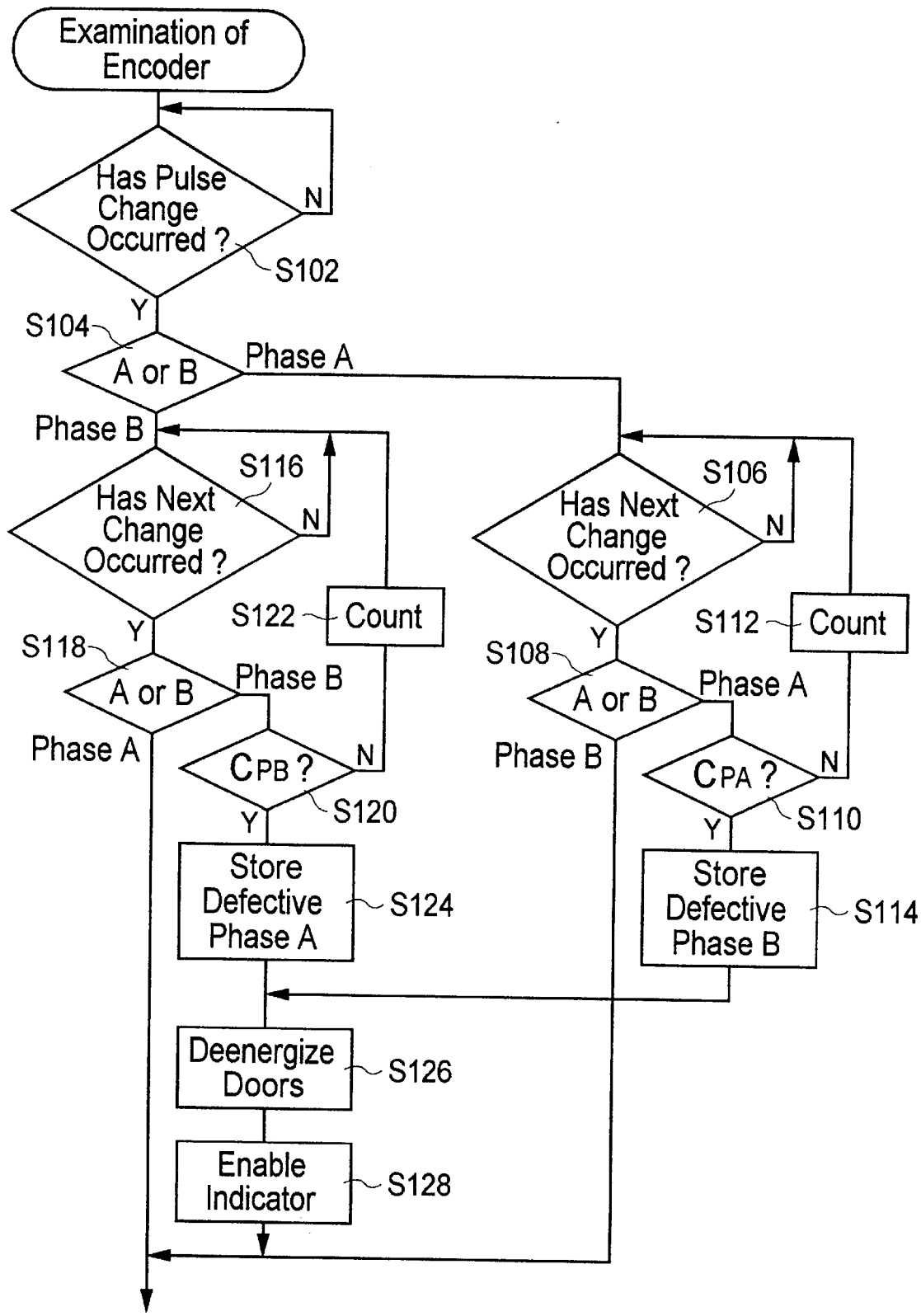
FIG. 13 is a flow chart for examining the two-phase signals of FIG. 12.

If the motor 6 is a DC motor, the encoder 22 develops two pulse signals at phase A and phase B as the motor 6 rotates a predetermined angle. One of the two pulse signals of one of the two phases is shown in FIG. 11. This pulse signal is used to detect the speed and the position of the doors 2a and 2b. The pulse signals are coupled through a transmission line to the CPU 12. It may occur that noise enters into the transmission line, as indicated by broken lines in FIG. 11. If no measures are taken, the position and speed of the doors 2a and 2b cannot correctly determined, which results in improper operation of the doors 2a and 2b.

Then, the examination as shown in FIG. 10 is made. First, each time a change occurs in the pulse signal, judgment is made as to whether the change is a rising of the pulse or not (Step S92). If not, Step S92 is repeated. If the change is a rising edge, the reference clock pulses are counted (Step S94), and whether the next rising has occurred or not is judged (Step S96). If the next rising has not yet occurred, Step S94 is repeated. The count of the reference clock pulses when the next rising occurs represents a time period from one rising edge of the pulse signal to the next rising edge, i.e. one period of the pulse signal.

The count is compared with a predetermined value FP (Step S97), and, if the count is smaller than the predetermined value, the EEPROM 18 stores information indicating that the encoder frequency is not appropriate (Step S98), together with the date and the time of day of occurrence of such frequency abnormality. Then, the doors are deenergized so that they can be manually moved (Step S99), and the indicator is enabled (Step S100). If, on the other hand, the reference clock pulse count is larger than the predetermined value $F_P$, the next processing is done. The predetermined value $F_P$ is a value corresponding to a short period which is impossible even when the driving force transmitting arrangement 4 is broken and, as a result, the motor 6 races.

If it is found that the frequency of the signal from the encoder 22 exhibits an inappropriate value, the maintenance man can know quickly what step should be taken. For example, the transmission line from the encoder 22 may be replaced with a line into which external noise hardly enters.

Alternatively, the time period between one falling edge and the next falling edge may be measured.

Examination of Encoder Signals

As described previously, if a DC motor is used as the motor 6, the encoder 22 develops two phase pulse signals comprising a phase A component and a phase B component. One component rises and falls after the other component rises and falls, respectively. Which one of the two phase components rises and falls prior to the other depends on the direction of the rotation of the motor 6. For example, if the encoder 22 fails to operate properly, or if one of the connection lines between the encoder 22 and the CPU 12 is broken, one of the two components will not be developed, as shown in FIG. 12.

In order to know this, examination is made as to if rising or falling, i.e. a change, has occurred in either of the phase A and B signals (Step S102). If no rising or falling is detected, Step S102 is repeated. If either of rising or falling is detected, judgment is made as to in which phase signal the detected rising or falling has occurred, phase A or B (Step S104).

If it is in the phase A signal that the detected change has occurred, then, whether a next rising or falling or change has occurred or not is judged (Step S106). If the next change has not yet occurred, Step S106 is repeated. If the next change is detected, judgment is made as to in which phase signal the detected change has occurred (Step S108). If it is the phase B signal, it is justified to conclude that both phase A and B pulse signals are occurring in a normal relationship with each other and, therefore, the encoder 22 is properly operating and the connections to which are normal and proper. Then, the encoder examination is finished.

If the signal is judged to be the phase A signal in Step S108, i.e. if a change has consecutively occurred in the same phase signal, judgement is made as to whether or not the number of consecutive occurrences of change in the same phase pulse signal has reached a predetermined number $C_{PA}$ (Step S110). If NO, a counter which counts such occurrences is incremented by one (1), and the processing returns to Step S106. If the number of consecutive occurrences of change in the same phase pulse signal is judged to be equal to the predetermined number $C_{PA}$, it can be concluded that the phase B pulse signal is defective, and it is stored in the EEPROM 18 together with the date and the time of day of such occurrence (Step S114).

In Step S104, if it is judged that it is in the phase B pulse signal that the change, i.e. rising or falling, has occurred, a judgment is made as to if a next change has occurred in either of the pulse signals (Step S116). This Step S116 is repeated until a next change is detected. When the next change occurs, judgment is made as to in which phase signal the change has occurred (Step S118). When it is in the phase A signal that the pulse change has occurred, it is justified to conclude that the encoder 22 is operating properly and the encoder connections are appropriate because the phase A pulse signal rises or falls after the phase B signal rises or falls. Then, this processing is finished.

On the other hand, if, in Step S118, it is judged that the pulse signal in which the detected change has occurred is the phase B signal, which means that rising and falling of the same phase signal have been consecutively detected in the same phase pulse signal, judgment is made as to whether or not the number of consecutive occurrences of change in the phase B signal has reached a predetermined number $C_{PB}$ (Step S120). If the number of consecutive occurrences of change in the phase B signal is not equal to the predetermined number $C_{PB}$, the count in a counter which counts such occurrences is incremented by one (Step S122), and Step S116 is repeated. If Step S120 judges that the predetermined number, $C_{PB}$, of consecutive occurrences of change in the phase B pulse signal have been detected, it can be judged that the phase A signal is defective. Then, it is stored in the EEPROM 18 that the phase A signal is defective, and at the same time, the date and the time of day of the detection of the defect in the phase A pulse signal are stored (Step S124). Preferably, the above-described predetermined numbers $C_{PA}$ and $C_{PB}$ are a plural number when the previously described frequency abnormality of the encoder signals is taken into account.

When defectiveness is found in either of the phase A and B pulse signals in Step S114 or S124, the doors 2a and 2b are deenergized so that they can be moved manually (Step S126), and the indicator 56 is enabled (Step S128). Then, the examination of the encoder is finished. When the maintenance man connects the Handy Terminal HT to the control section 10, it is displayed on it that the encoder fails to operate properly, and he can replace it with a new one. In this way, failure or malfunction of the encoder 22 can be quickly removed.

In case that a three-phase brushless motor is used as the motor 6, an encoder which develops three pulse signals having phases A, B and C spaced by 120 degrees from each other, as shown in FIG. 14, may be used as the encoder 22.

In FIG. 14, one cycle of the phase A pulse signal, i.e. a time period between the time at which the phase A signal rises from its low level (L) to a high level (H) and the time at which it rises again, is shown as being divided into six equal time sections. There are six combinations of the levels of the three phase signals, namely, a first combination of the H level of the phase A signal, the L level of the phase B signal, and the H level of the phase C signal; a second combination of the H level of the phase A signal, the L level of the phase B signal, and the L level of the phase C signal; a third combination of the H level of the phase A signal, the H level of the phase B signal, and the L level of the phase C signal; a fourth combination of the L level of the phase A signal, the H level of the phase B signal, and the L level of the phase C signal; a fifth combination of the L level of the phase A signal, the H level of the phase B signal, and the H level of the phase C signal; and a sixth combination of the L level of the phase A signal, the L level of the phase B signal, and the H level of the phase C signal. Either a combination X in which all of the three phase signals are at the H level, or a combination Y in which all of the three phase signals are at the L level never occurs.

Now, let it be assumed that the encoder 22 malfunctions, and the phase A signal continues to be at the H level. In this case, the first, second and third level combinations occur in the named order, but after it, the third combination occurs again which is followed by the X combination and the first combination in the named order. In other words, the first, second, third and X combinations occur, but none of the fourth, fifth, sixth and Y combinations occurs.

If the phase A signal is continuously at the L level, the sixth, Y, fourth, fifth and sixth combinations occur in the named order, but none of the first through third and X combinations occurs.

Similarly, with the phase B signal being continuously at the H level, the third through fifth and X combinations occur, but none of the sixth, first, second and Y combinations occurs. With the phase B signal continuing to be at the L level, the sixth, first, second and Y combinations occur, but none of the third through fifth and X combinations occurs. With the phase C pulse being continuously at the H level, the fifth, sixth, first and X combinations occur, but none of the second through fourth and Y combinations occurs. If the phase C pulse signal continues to be at the L level, the second through fourth and Y combinations occur, but none of the fifth, sixth, first and X combinations occurs.

Figure 15:
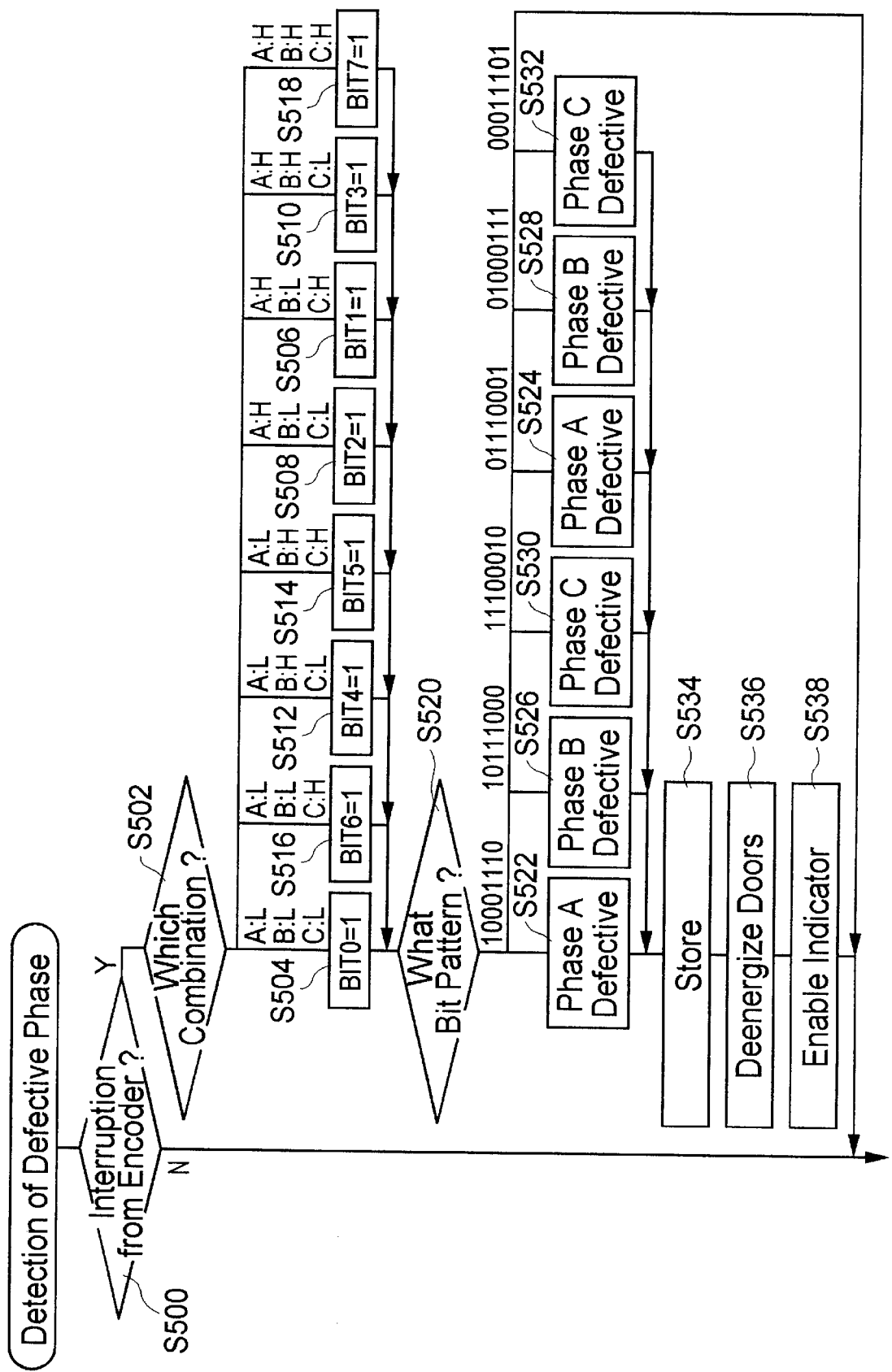
FIG. 15 is a flow chart for examining the three-phase signals of FIG. 14.

Every time any of the phase A, B and C signals rises or falls, the CPU 12 is interrupted. As shown in FIG. 15, when the CPU 12 judges that an interruption is made from the encoder 22 (Step S500), it makes a judgment as to which one of the six level combinations the currently occurring combination is (Step S502). If the current combination is the Y combination, for example, the bit 0 of an 8-bit region secured in the RAM 16 is set to "1" (Step S504). If the combination is the first combination, the bit 1 is set to "1" (Step S506). If the second combination is detected, the bit 2 is set to "1" (Step S508). If the third combination is detected, the bit 3 is set to "1" (Step S510). If the fourth combination is detected, the bit 4 is set to "1" (Step S512). If the fifth combination is detected, the bit 5 is set to "1" (Step S514). If the sixth combination is detected, the bit 6 is set to "1" (Step S516). If the X combination is detected, the bit 7 is set to "1" (Step S518).

Then, judgment is made as to what bit pattern the 0-th through seventh bits form (Step S520). That is, judgment is made as to which one of the bit patterns the 0th through seventh bits form, "10001110" which means that there are the X, first, second and third level combinations, "10111000" which means there are the X, third, fourth and fifth combinations, "11100010" which means that the X, fifth, sixth and first combinations, "01110001" which means that there are the fourth, fifth, sixth and Y combinations, "01000111" which means that there are the sixth, first, second and Y combinations, or "00011101" which means that there are the second, third, fourth and Y combinations.

If the bit pattern is "10001110", the phase A signal is judged defective (Step S522). If it is "01110001", the phase A signal is judged defective (Step S524). If the bit pattern is "10111000", the phase B signal is judged defective (Step S526). If the bit pattern is "01000111", the phase B signal is judged defective (Step S528). If it is "11100010", the phase C signal is judged defective (Step 530).

If the bit pattern is "00011101", the phase C signal is judged to be defective. If the bit pattern is not any of the described ones, no judgment of defectiveness is made. Thus, only after bit pattern examination for at least one cycle is made, correct judgment as to whether any one of the three phase signals is defective or not can be made.

When any one of the three phase signals is judged defective, the EEPROM 18 stores the information together with the date and the time of day at which the defective phase signal is detected (Step S534). Then, the doors 2a and 2b are deenergized (Step S536) so that the doors can be moved manually, and the indicator 56 is enabled (Step S538).

Examination of Sensors

Figure 17:
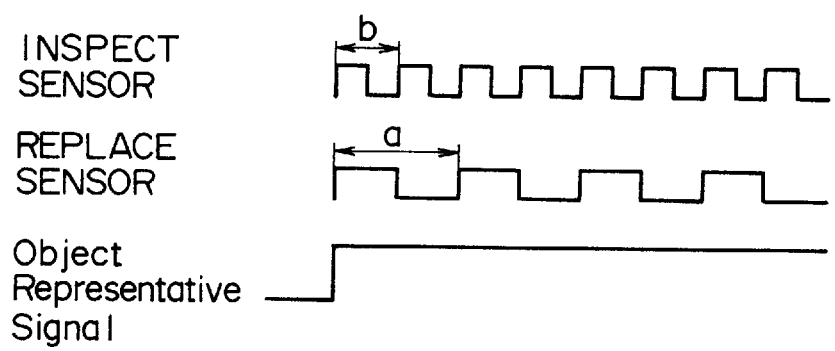
FIG. 17 shows signals which the sensor may develop.

The sensor 24A and 24B includes the means 27A and 27B, respectively, which, when the sensors become defective, develop either one of two pulse signals, namely, an INSPECT SENSOR signal having a period of "b" and a REPLACE SENSOR signal having a different period of "a", as shown in FIG. 17. The INSPECT SENSOR signal indicates that the sensor should be inspected, while the REPLACE SENSOR signal means that the sensor should be replaced. Thus, by determining the period of the pulse signals from the sensors 24A and 24B, it is possible to know if the sensors fails to operate or malfunctions and what type of failure or malfunction the detected failure is.

Figure 16:
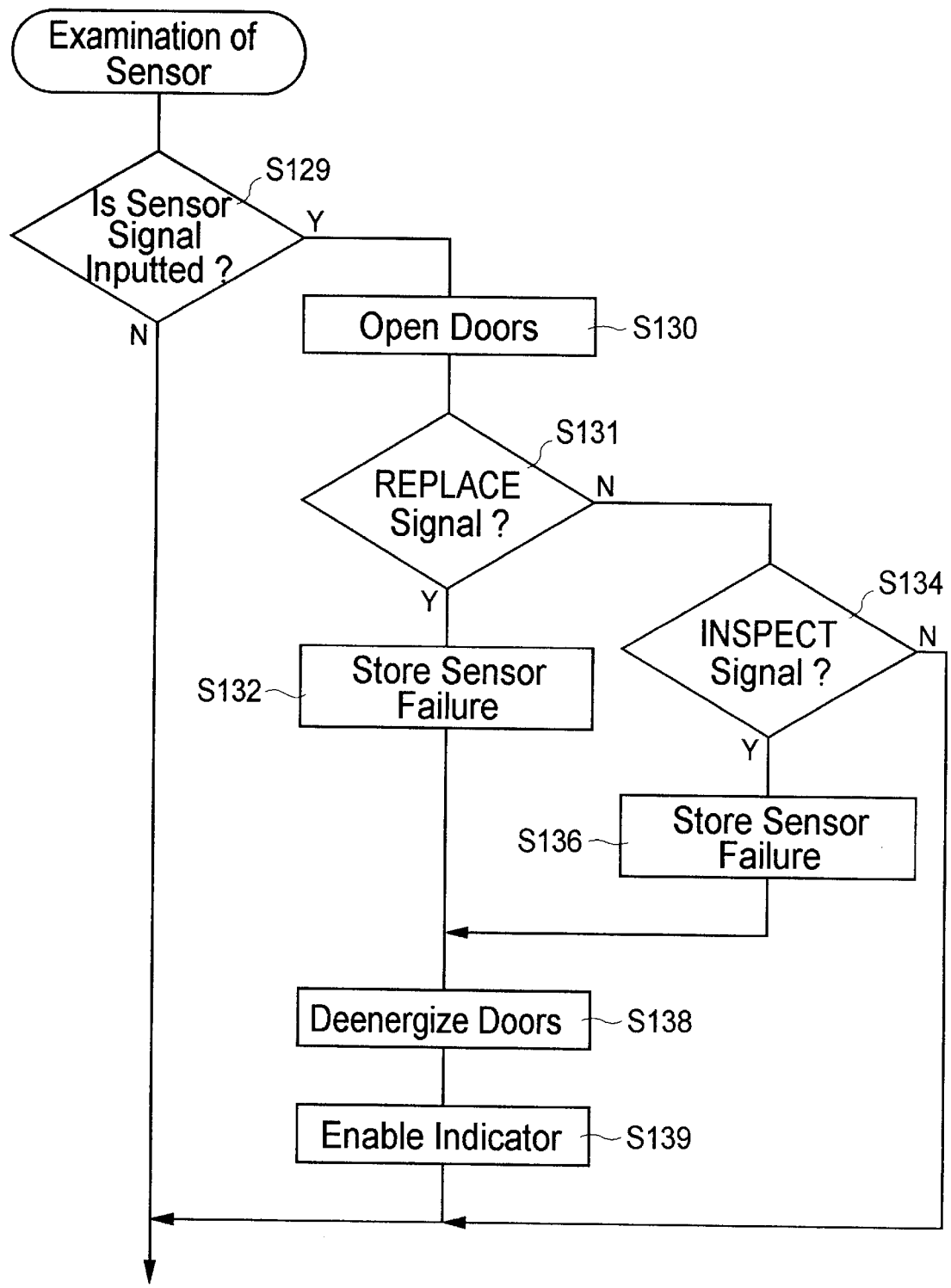
FIG. 16 is a flow chart for detecting failure of a sensor of the system of FIG. 1.

As shown in FIG. 16, judgment is made as to whether a signal is inputted from the sensor 24A or 24B (Step S129). If a sensor signal is inputted, the doors 2a and 2b are driven open (Step S130). Then, a judgment is made as to whether the sensor signal is a pulse signal having the period of "a", i.e. the REPLACE SENSOR signal (Step S131). If the sensor signal is the REPLACE SENSOR signal, the sensor from which the REPLACE SENSOR signal is inputted is determined by determining the I/O interface 25A or 25B through which the REPLACE SENSOR signal is inputted. Then, data showing that the determined sensor should be replaced is stored in the EEPROM 18, together with the date and the time of day of occurrence of the sensor failure (Step S132).

If, in Step S131, it is judged that the pulse signal having the period of "a" has not been inputted, a judgment is made as to whether a pulse signal having the period "b", i.e. the INSPECT SENSOR signal, has been inputted (Step S134). If it has been judged that the INSPECT SENSOR signal has been inputted, the sensor from which the INSPECT SENSOR signal is inputted is determined by determining the I/O interface 25A or 25B through which the INSPECT SENSOR signal is inputted. Then, data showing that the determined sensor should be inspected is stored in the EEPROM 18, together with the the date and the time of day of occurrence of the sensor failure or malfunction (Step S136).

Following Step S132 or 136, the doors 2a and 2b are deenergized (Step S138), and the indicator 56 is enabled to produce an intermittent light signal (Step S139), which completes the examination of the sensors.

When the maintenance man connects the Handy Terminal HT to the control section 10, the sensor which requires replacement or inspection is displayed on it. Thus, the sensor can be quickly replaced or inspected.

Examination of Motor Current

Figure 18:
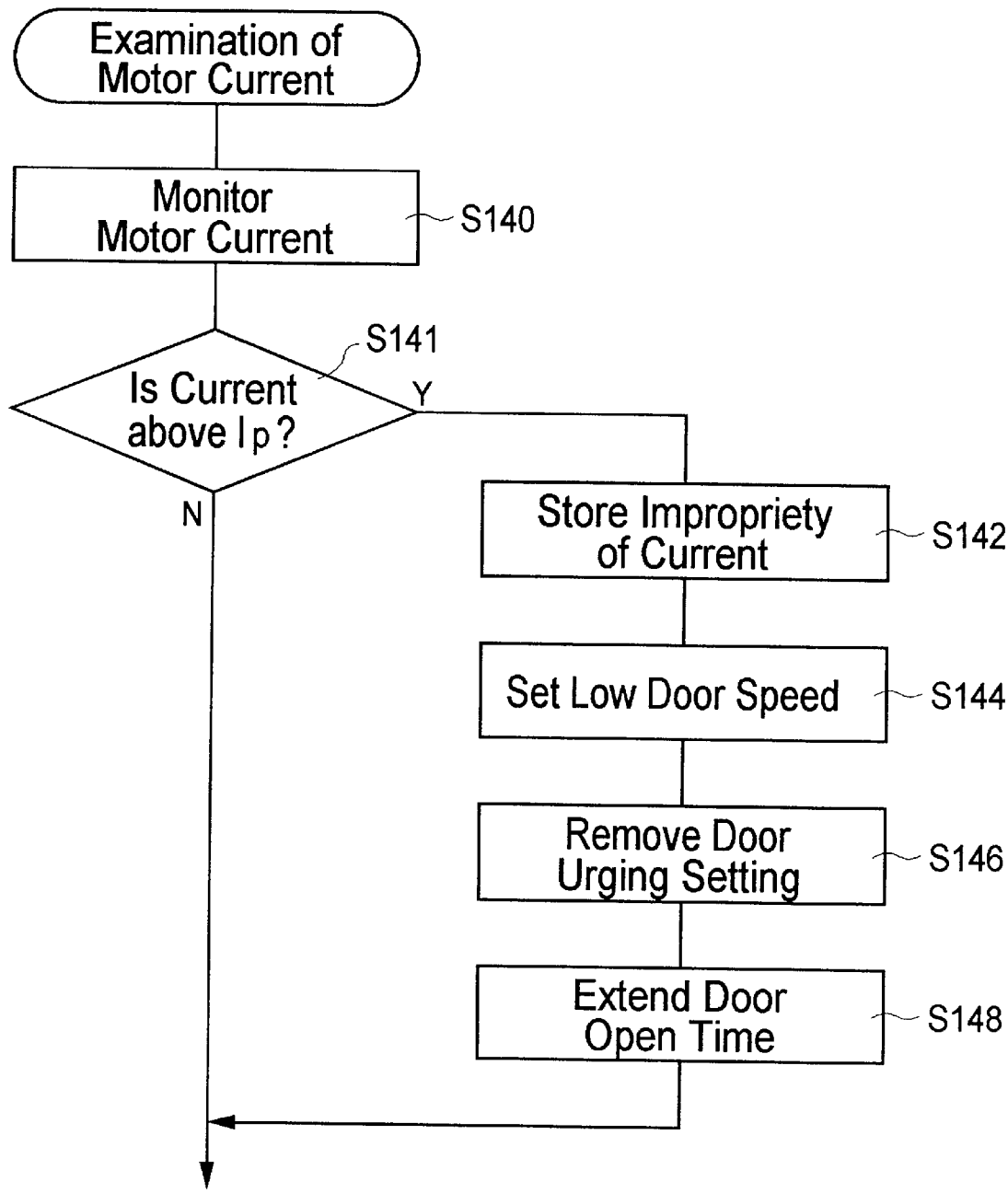
FIG. 18 is a flow chart for examining current flowing in the motor of the system of FIG. 1.

When the motor 6 is operating properly, current flowing in the rotating motor 6 is below a predetermined value $I_P$. Then, as shown in FIG. 18, current flowing in the motor 6 is measured by means of the motor current monitoring section 28 (Step S140). A judgment is made as to whether the measured current is above the predetermined value $I_P$ or not (Step S141). A motor current greater than the predetermined value $I_P$ is improper, and, therefore, it is stored in the EEPROM 18, together with the date and the time of day at which the improper current flowed (Step S142). Then, the operating parameters are altered (Step S144) such that after that the doors 2a and 2b are moved at a low speed (Step S144), and the setting of the urging of the doors at the ends of opening and closing operations is removed (Step S146). In other words, when the doors 2a and 2b in the fully closed positions, the motor 6 is not driven to urge them against each other, and when the doors are in their fully opened positions, the motor 6 is not driven to urge them against doorjambs. Further, the operating parameters are also altered to extend the door open time (Step S148). The execution of these Steps S144, S146 and S148 reduces loading on the motor 6 so that the motor 6 will not be damaged to such an extent that it cannot move the doors 2a and 2b at all.

When the maintenance man connects the Handy Terminal HT to the control section 10, motor current abnormality is displayed on it, and the maintenance man can know that the motor 6 is malfunctioning. Then, the motor replacement can be done quickly.

Examination of Motor Temperature

Figure 19:
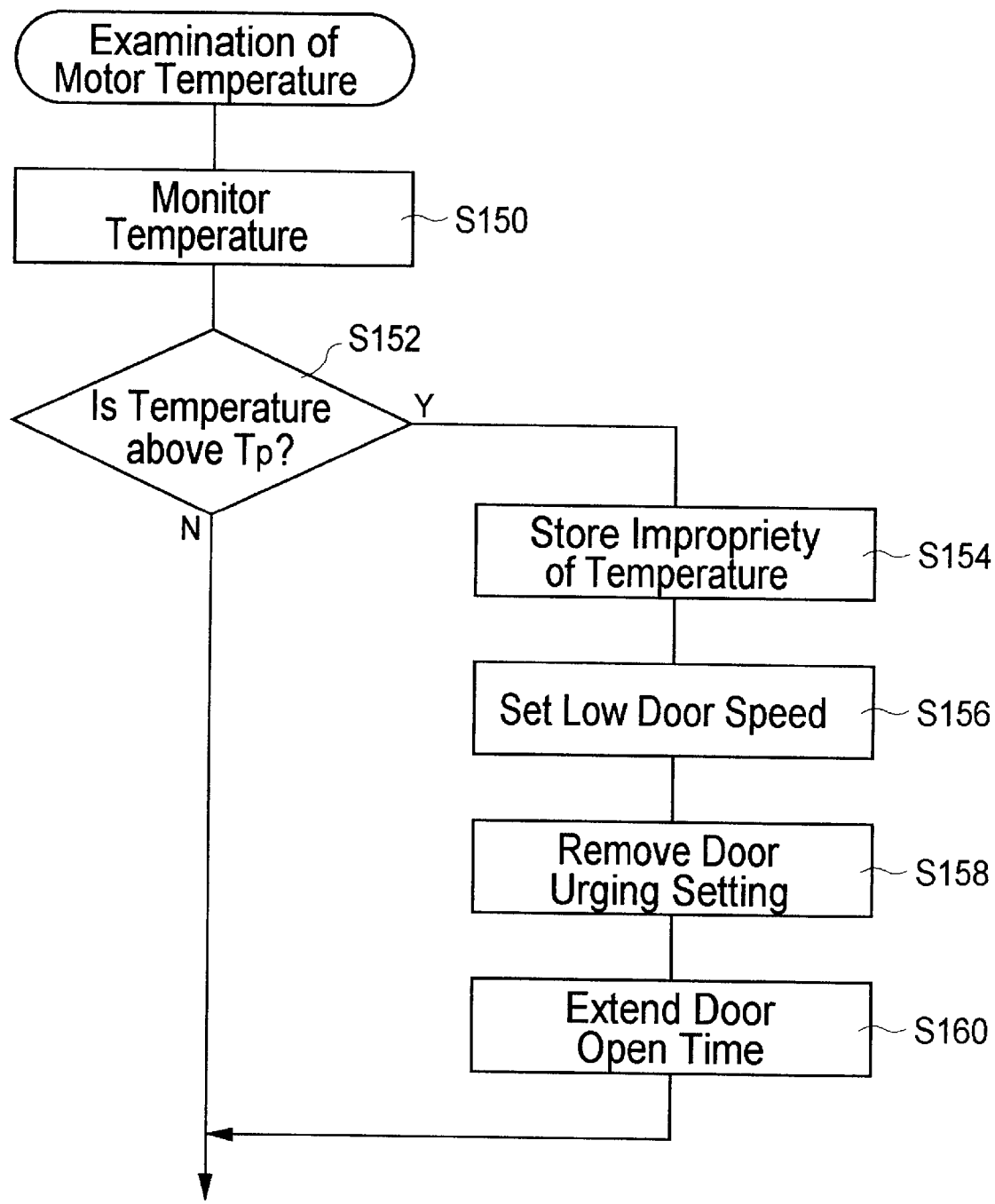
FIG. 19 is a flow chart for examining temperature of the motor of the system of FIG. 1.
Figure 20:
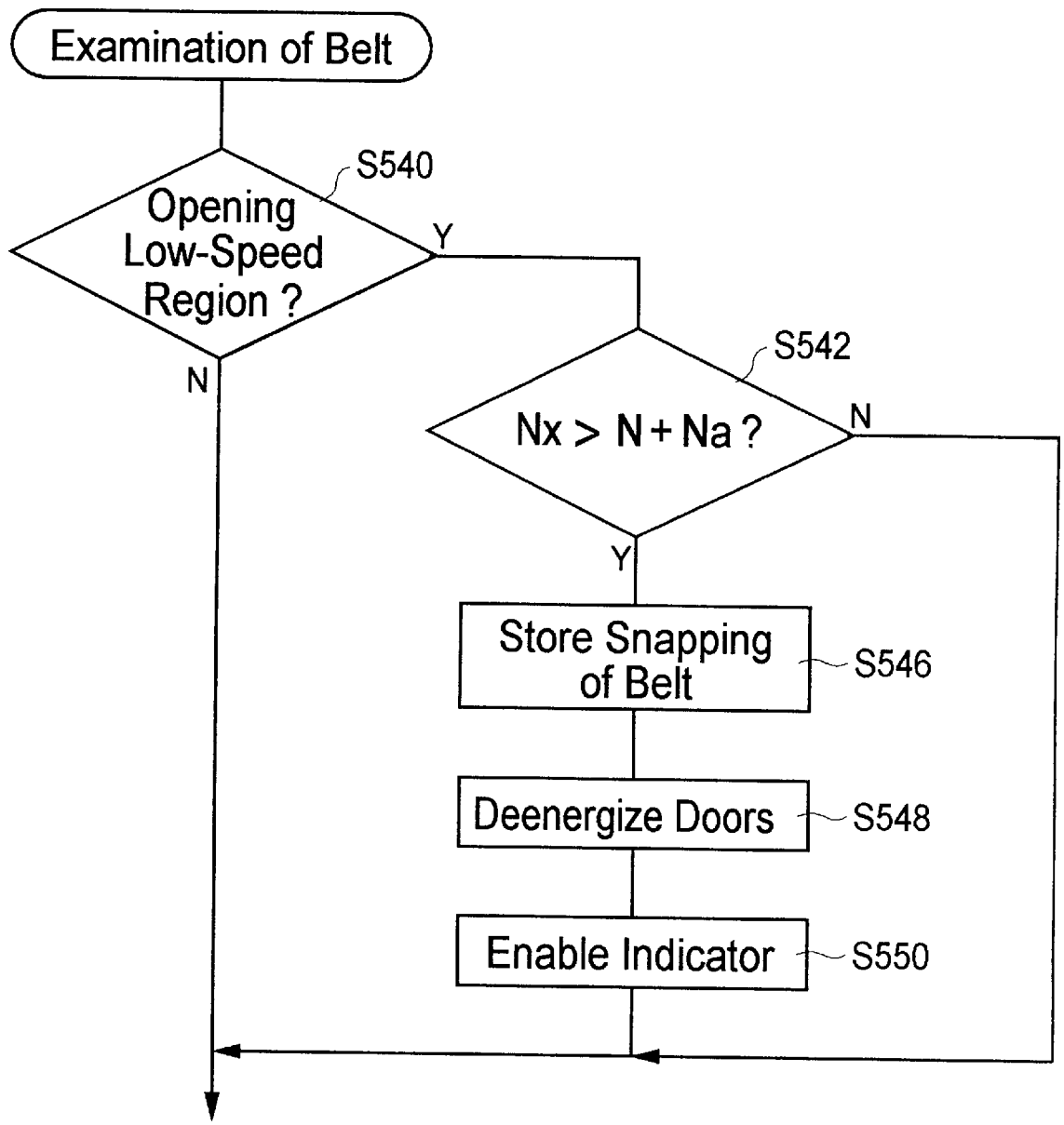
FIG. 20 is a flow chart for detecting the snapping of a belt for driving the door of the system of FIG. 1.

Each time the doors are driven, current flows in the motor 6, causing the motor 6 to generate heat, so that the temperature of the motor 6 increases. If the motor 6 is operating properly, the temperature of the motor 6 does not exceed a predetermined temperature $T_P$. Thus, as shown in FIG. 19, the temperature of the motor 6 is detected by the motor temperature monitoring section 30 (Step S150). Next, a judgment is made as to whether the detected temperature is above the predetermined temperature $T_P$ or not (Step S152). If it is above the predetermined temperature $T_P$, it is known that the motor temperature is improperly high, which is stored in the EEPROM 18, together with the date and the time of day of its occurrence. Then, a low door speed is set (Step S156), the setting of the urging of the doors in the fully opened and closed positions is removed (Step S158), and the door open-time is extended (Step S160), as done in Steps S144, S146 and S148, for the same reason as described above with respect to the examination of the motor current. The maintenance man can know that the motor temperature is too high, when he connects his Handy Terminal HT, so that he can replace the motor 6.

Examination of Belt

Figure 21:
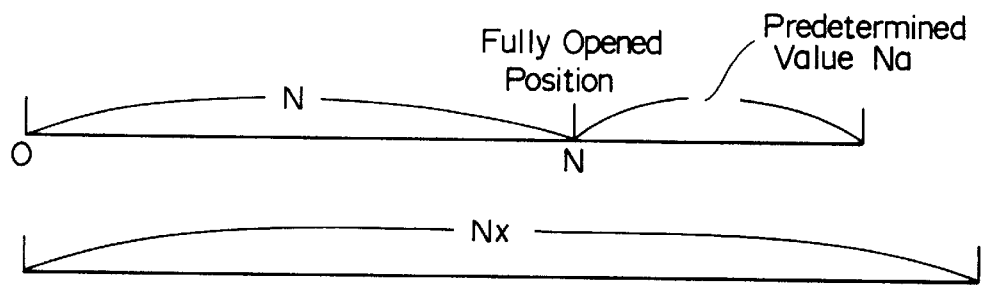
FIG. 21 illustrates how to detect the snapping of a belt.

The rotation of the motor 6 is transmitted to the doors 2a and 2b via the belt 4c. After a long use, the belt 4c may happen to be snapped. The pulses from the encoder 22 may be counted, while the doors are moving, for example, from the fully closed positions of the doors 2a and 2b to the fully opened positions. If the belt is whole, the resulting count Nx will be N as shown in FIG. 21. If the count Nx is much larger than the value N, it can be judged that the belt 4c has been snapped.

In order to determine the snapping of the belt 4c, a judgment is made first as to whether the doors 2a and 2b are in the low-speed region in their opening operation, for example (Step S540). If the doors are in their opening low-speed region, whether the encoder pulse count Nx is larger than the count N for the fully opened position plus a predetermined margin Na (Step S542). If it is judged that Nx is larger than N+Na, it can be judged that the belt 4c has been snapped, which is, then, stored in the EEPROM 18, together with the date and the time of day of occurrence of the snapping of the belt 4c (Step S546). Then, the doors 2a and 2b are deenergized (Step S548) so that the doors can be moved manually, and the indicator 56 is enabled (Step S550). The belt may be examined during the closing operation of the doors 2a and 2b.

Examination of Magnetization of Motor Magnet

Figure 23:
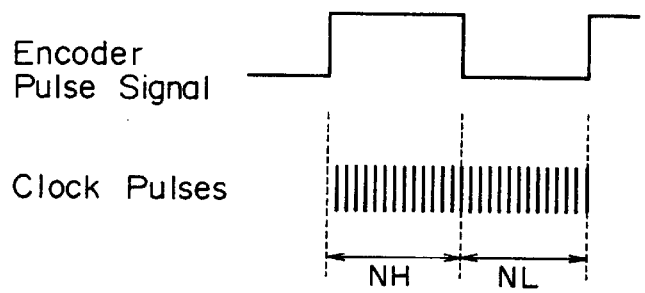
FIG. 23 illustrates how to determine improper magnetization of the magnet of the motor.

As previously described, a three-phase brushless motor may be used as the motor 6. The three-phase brushless motor 6 includes permanent magnets. The encoder 22 may be of a type which includes a magnetic field sensor for detecting changes in magnetic fields and developing pulse signals representative of field changes. Let it be assumed, for example, that, as shown in FIG. 23, the sensor develops an output signal which is at a high (H) level when the field sensor of the encoder 22 is facing the S pole of a permanent magnet, and is at a low (L) level when the sensor faces the N pole of the permanent magnet. The permanent magnet may loose its magnetic force as time passes, which changes the magnetic field distribution. In such a case, in a state in which the motor 6 is rotating at a substantially constant rate, the ratio between the time period in which the output signal of the field sensor is at the H level and the time period in which the output signal is at the L level may deviate from a predetermined range. Then, the motor 6 should be inspected.

Figure 22:
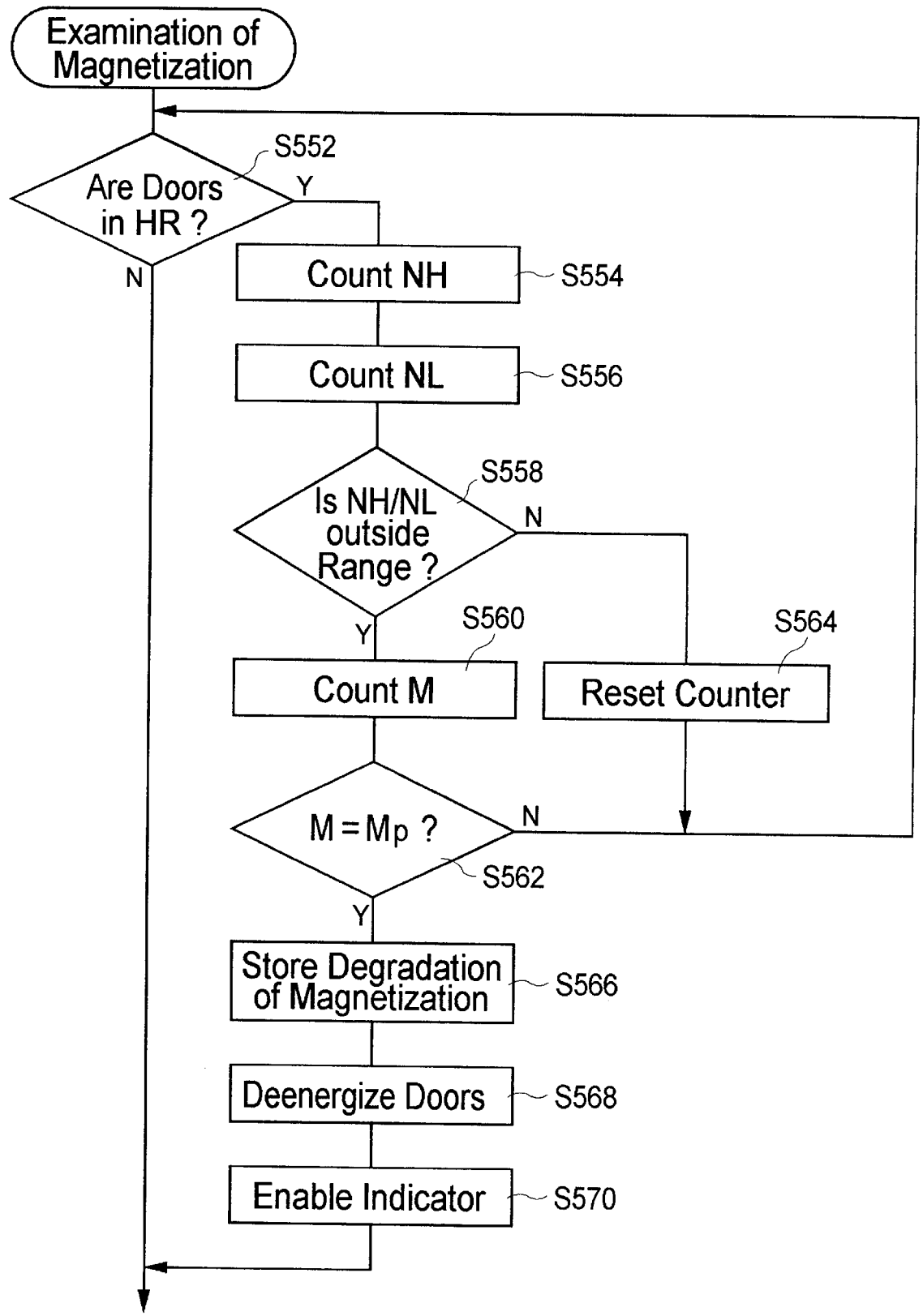
FIG. 22 is a flow chart for determining whether the magnetization of a motor magnet of the system of FIG. 1 is normal or not.

Examination of the magnetization of a motor magnet is done as shown in FIG. 22. First, a judgment is made as to whether the doors are in the high-speed region in which the motor 6 is rotating at substantially a fixed rate (Step S552). If the doors are judged to be moving in the high-speed region, the number NH of the reference clock pulses generated by the clock signal generating circuit 20 during the time interval when the pulse signal of the encoder 22 is at the H level, i.e. during a time interval between a rising edge and the next falling edge of the pulse signal, is counted (Step S554). In other words, the time interval in which the pulse signal from the encoder 22 is at the H level is measured. Then, the number NL of the reference clock pulses generated by the reference clock signal generating circuit 20 during a time interval between the falling edge to the next rising edge of the pulse signal from the encoder 22, is counted (Step S556). In other words, the length of the time interval during which the signal from the encoder 22 is at the L level is measured. Then, the ratio of NH to NL is calculated, and a judgment as to whether the ratio is outside a predetermined range or not is made (Step S558). If the answer to Step S558 is YES, the count M in a counter which counts the number of times the ratio is judged to be outside the predetermined range is incremented by one (1) (Step S560).

Then, a judgment is made as to whether M has reached a predetermined value $M_P$ or not (Step S562). If M has not yet reached $M_P$, the processing returns to Step S552 and Steps S554 through S558 are executed. If the ratio NH/NL comes in the predetermined range during the execution of Steps S554 through S558, the counter counting M is reset (Step S564), and the processing is started again from Step S552.

If the count M is judged to have reached $M_P$, it can be judged that the magnetization of the permanent magnet of the motor 6 has been degraded. Accordingly, this judgment is stored in the EEPROM 18, together with the date and the time of day at which the judgment is made (Step S566). Then, the doors 2a and 2b are deenergized (Step S568), and the indicator 56 is enabled (Step S570).

Examination of Re-Opening Operation

When one or both of the doors 2a and 2b come into contact with something during the door closing operation, the doors 2a and 2b are re-opened back to the fully opened-positions for the safety purpose. The doors are re-opened not only when, for example, a human contacts the doors 2a and 2b during the closing operation, but also when, for example, doors 2a or 2b contacts a small stone caught in a guide rail for the doors on the floor. Therefore, if the re-opening operation of the doors occurs frequently, it may be judged that a stone or the like is caught in the guide rail.

Figure 24:
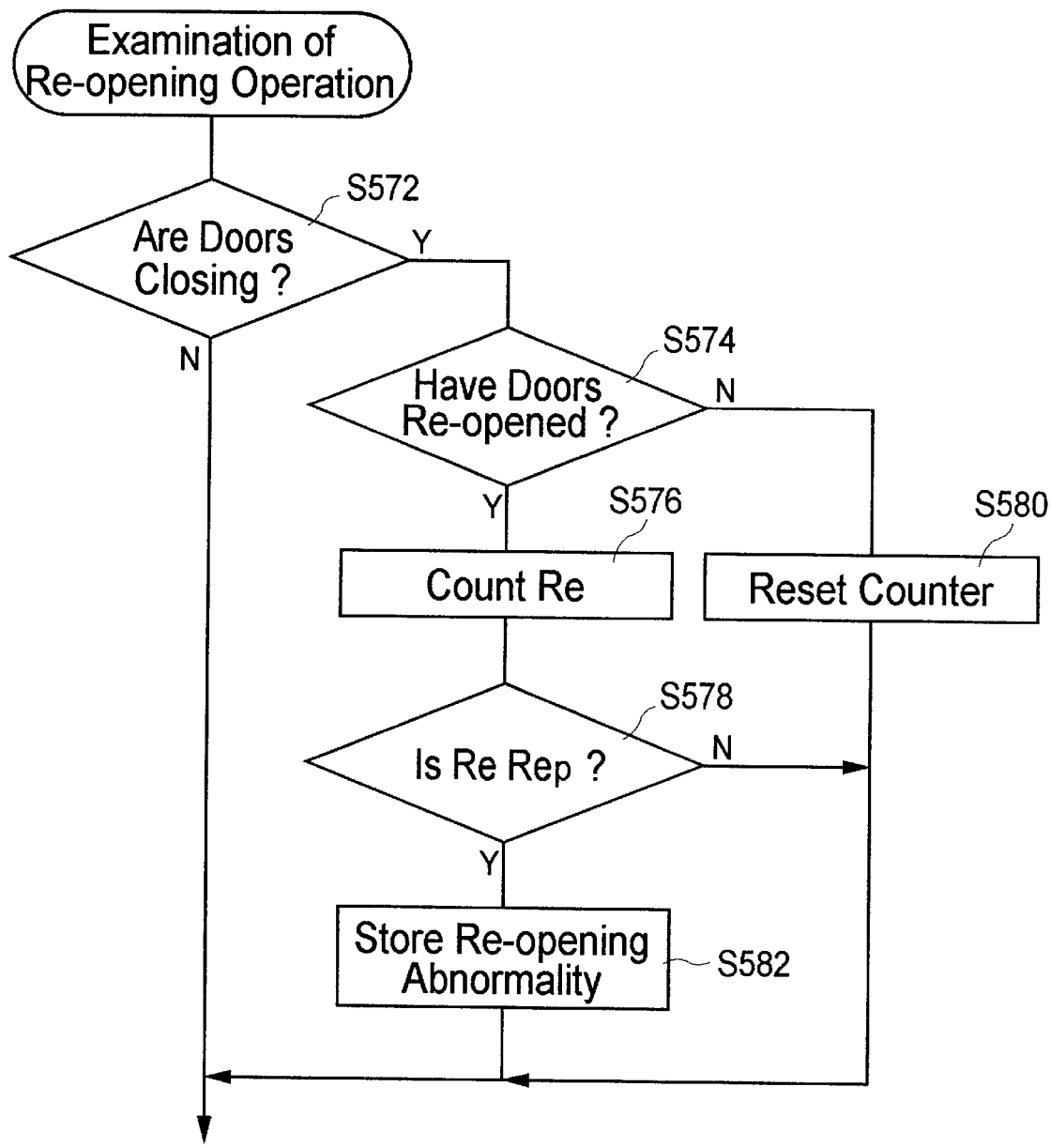
FIG. 24 is a flow chart for determining improper re-opening operation of the door of the system of FIG. 1.

In order to examine the re-opening operation of the doors, the processing shown in FIG. 24 is achieved. First, a judgment is made as to whether the doors 2a and 2b are closing or not (Step S572). If it is judged that the doors are closing, a judgment is made as to whether the doors have been re-opened (Step S574). If the doors have been re-opened, the number Re of the re-opening operations that have taken place is counted (Step S576), and a judgment is made as to whether the counted number has reached a predetermined number $Re_P$ or not (Step S578). If Re has not yet reached $Re_P$, other processing is achieved, and, then, Step S572 is executed again. If the doors are in the closing operation, whether the doors have been re-opened or not is judged in Step S574. If the doors have not been re-opened this time in Step S574, it can be judged that the previous re-opening of the doors was due to the contact of a human or moving object with the doors, and, the counter which counts the number of the re-opening operations is reset (Step S580) and other processing is done. If, on the other hand, it is judged that the doors have been re-opened again in Step S574, Steps 576 and 578 are executed again. If the reopening operation of the doors is consecutively repeated the predetermined number $Re_P$, it can be judged that a stone or something is caught in the guide rail. Then, it is stored in the EEPROM 18, together with the date and the time of day at which the reopening operation was repeated (Step S582), and other processing is executed.

Handy Terminal

Figure 25:
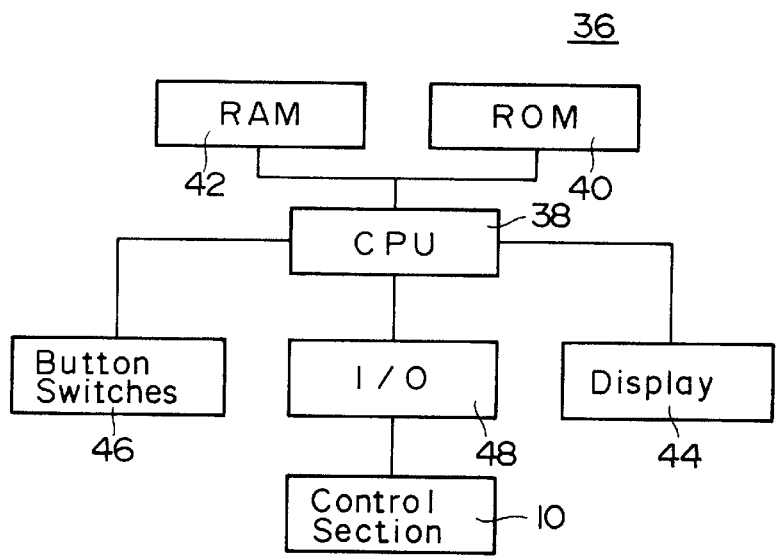
FIG. 25 is a block diagram of a hand-held computer (Handy Terminal) used with the system of FIG. 1.

An output unit, e.g. the Handy Terminal 36 is disconnectably connected to the control section 10 for the purpose of the maintenance of the automatic door system. The Handy Terminal 36 includes a CPU 38, a ROM 40, a RAM 42, a display 44, and button switches 46, as shown in FIG. 25.

The CPU 38 is adapted to be connected through an I/O interface 48 of the automatic door system to the control section 10. When the CPU 38 is connected to the control section 10, data relating to failure and malfunction of the devices and components of the door system stored in the EEPROM 18 etc. is transferred to the CPU 38 and stored in the RAM 42. What are stored in the RAM 42 are displayed on the display 44.

Figure 26:
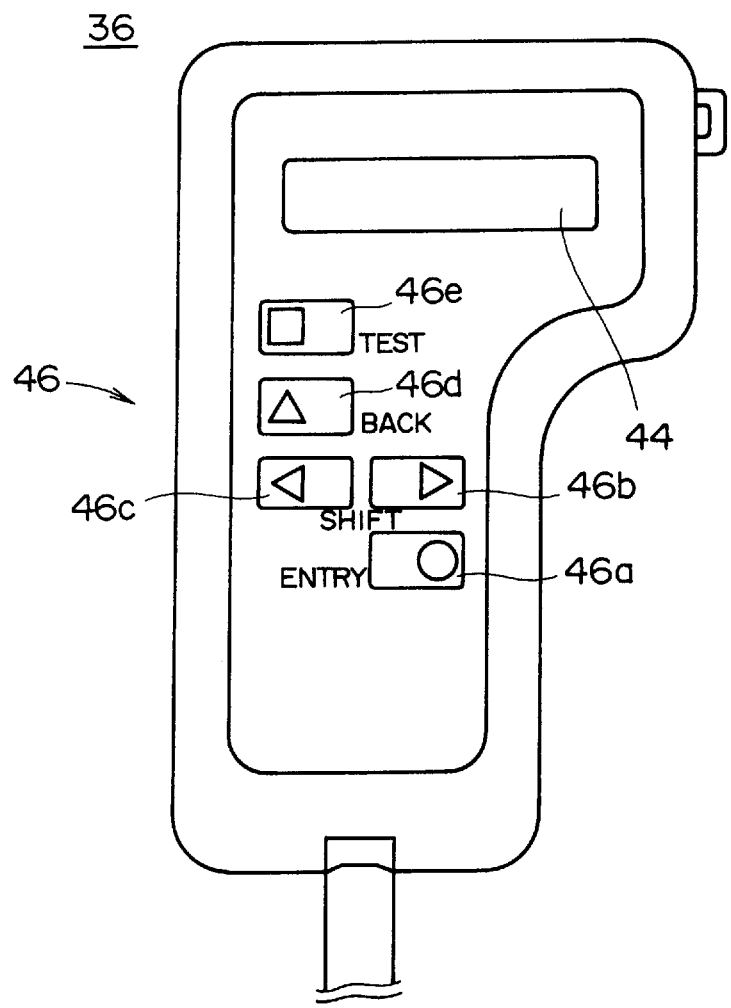
FIG. 26 is a front view of the hand held computer of FIG. 25.

The button switches 46 includes, as shown in FIG. 26, an ENTRY button 46a, SHIFT buttons 46b and 46c, a BACK button 46d, and a TEST button 46e. Of these button switches, the ENTRY button 46a and the SHIFT buttons 46b and 46c pertain to the displaying of failure or malfunction.

Display on Handy Terminal

Figure 27A:
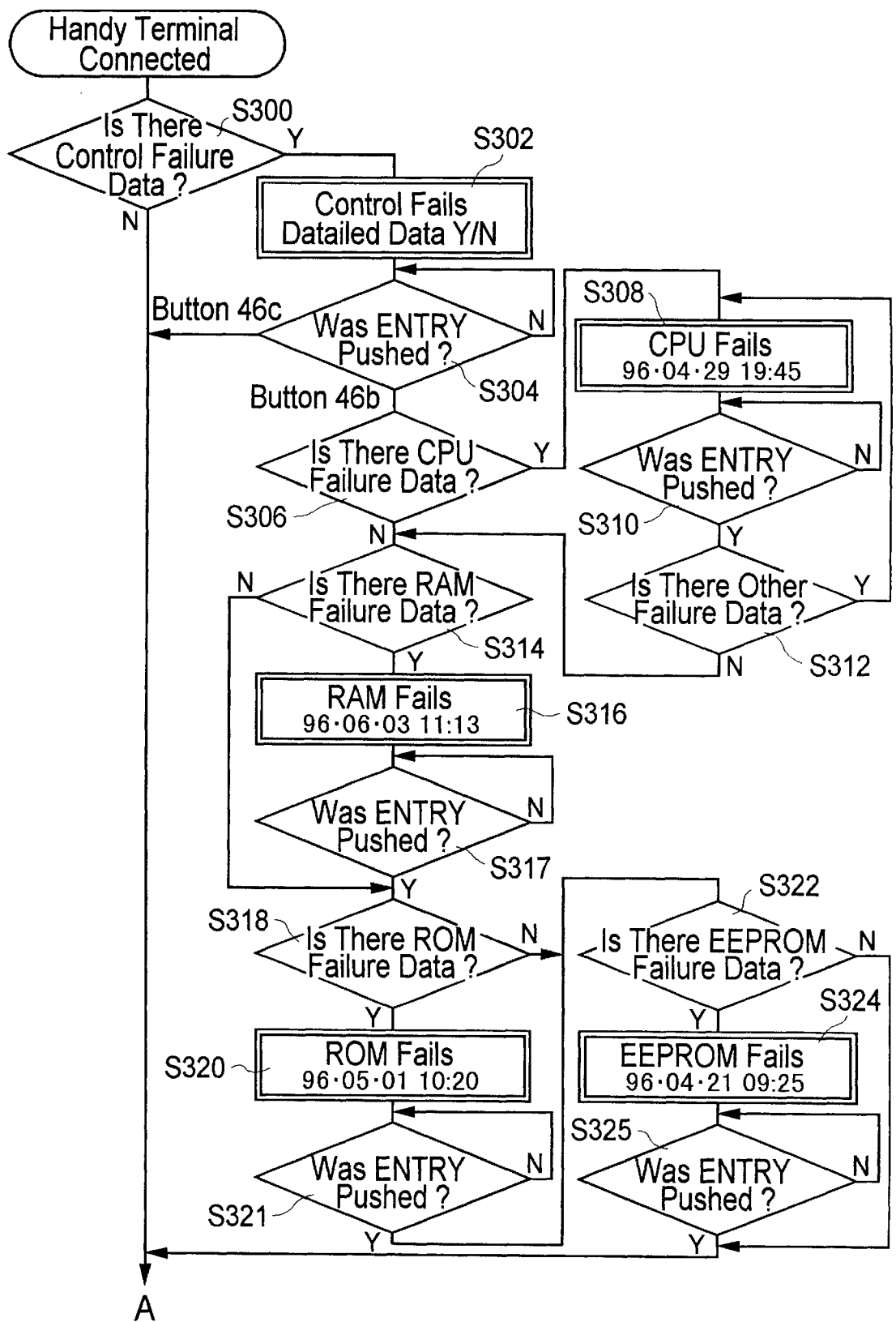
FIGS. 27A, 27B, 27C, 27D and 27E respectively show parts of a flow chart for providing displays in the system of FIG. 1.

When the Handy Terminal 36 is connected to the control section 10, the CPU 38 makes a judgment as to whether there is any data relating to failure or malfunction of the control section 10 in the data stored in the RAM 42 (Step S300), as shown in FIG. 27A. If there is such data, a display is provided on the display 44, indicating that the control section fails. At the same time, an inquiry as to whether details of the failure should be displayed or not is displayed (Step S302). If detailed data is required, the SHIFT button 46b is pressed, and if detailed data is not required, the SHIFT button 46c is pressed. Then, the ENTRY button 46a is pressed, and a judgment is made as to which one of the buttons 46b and 46c was pressed (Step S304). If the SHIFT button 46c was pressed, no detail is displayed, and the next processing is achieved. The maintenance man not need detailed information about the failure of the control section 10 if, for example, he decides to replace the control unit 3 with a new one when he sees the display of "Control Section Fails".

If the SHIFT button 46b was pressed, a judgment is made as to whether there is any data relating to disorderly operation of the CPU 12 in the data stored in the RAM 42 (Step S306). If there is, a display "CPU Disorderly Operation" and a display of the date and time of occurrence of the CPU disorderly operation are displayed (Step S308) in accordance with the first one of such data. Then, a judgment as to whether the ENTRY button 46a has been pushed or not is made (Step S310), and, if not, Step S310 is repeated. In this case, the displays on the display 44 is maintained. If it is judged that the ENTRY button 46a has been pushed, a judgment is made as to whether there is any other date relating to the disorderly operation (Step S312). If there is, Step S308 is repeated to display similar data as described above on the display 44. When all of the data relating to the CPU disorderly operation have been displayed, Step S312 judges that there is no data relating to the CPU disorderly operation left. Then, a judgment is made as to whether or not there is any data relating to malfunction of the RAM 16 (Step S314).

If it is judged that there is data relating to failure of the RAM 16, a display "RAM Fails" and the date and time of day of occurrence of the RAM failure are displayed (Step S316). Whether the ENTRY button 46a has been pushed or not is judged (Step S317), and Step S317 is repeated until the ENTRY button 46a is pressed. If it is judged that the ENTRY button 46a has been pressed in Step S317, or if it is judged that there is no data relating to failure of the RAM 16 in Step S314, then, a judgment is made as to whether or not there is data showing that the ROM 14 fails (Step S318). If there is, a display "ROM Fails" and a display of the date and time of day of occurrence of the ROM failure are displayed on the display 44 (Step S320). Then, whether or not the ENTRY button 46a has been pressed or not is judged (Step S321). Step S321 is repeated until the pressing of the ENTRY button 46a is detected.

If it is detected that the ENTRY button 46a has been pressed in Step S321, or if it is judged that there is no data relating to ROM failure in Step S318, a judgment is made as to whether or not there is data showing failure of the EEPROM 18 (Step S322). If there is, a display "EEPROM Fails" and a display of the date and time of day of occurrence of the EEPROM failure are displayed on the display 44 (Step S324). Then, whether or not the ENTRY button 46a has been pressed or not is judged (Step S325). Step S325 is repeated until the pressing of the ENTRY button 46a is detected. If it is detected that the ENTRY button 46a has been pressed in Step S325, or if it is judged that there is no data relating to EEPROM failure in Step S322, next processing is carried out.

Display of detailed information about the CPU failure described above may be desired by a maintenance man who is skillful at maintenance of the automatic door system and who wants to get data relating to the respective components of the control section 10 for inspection or replacement. The same thing can be said for the displays described below.

Figure 27B:
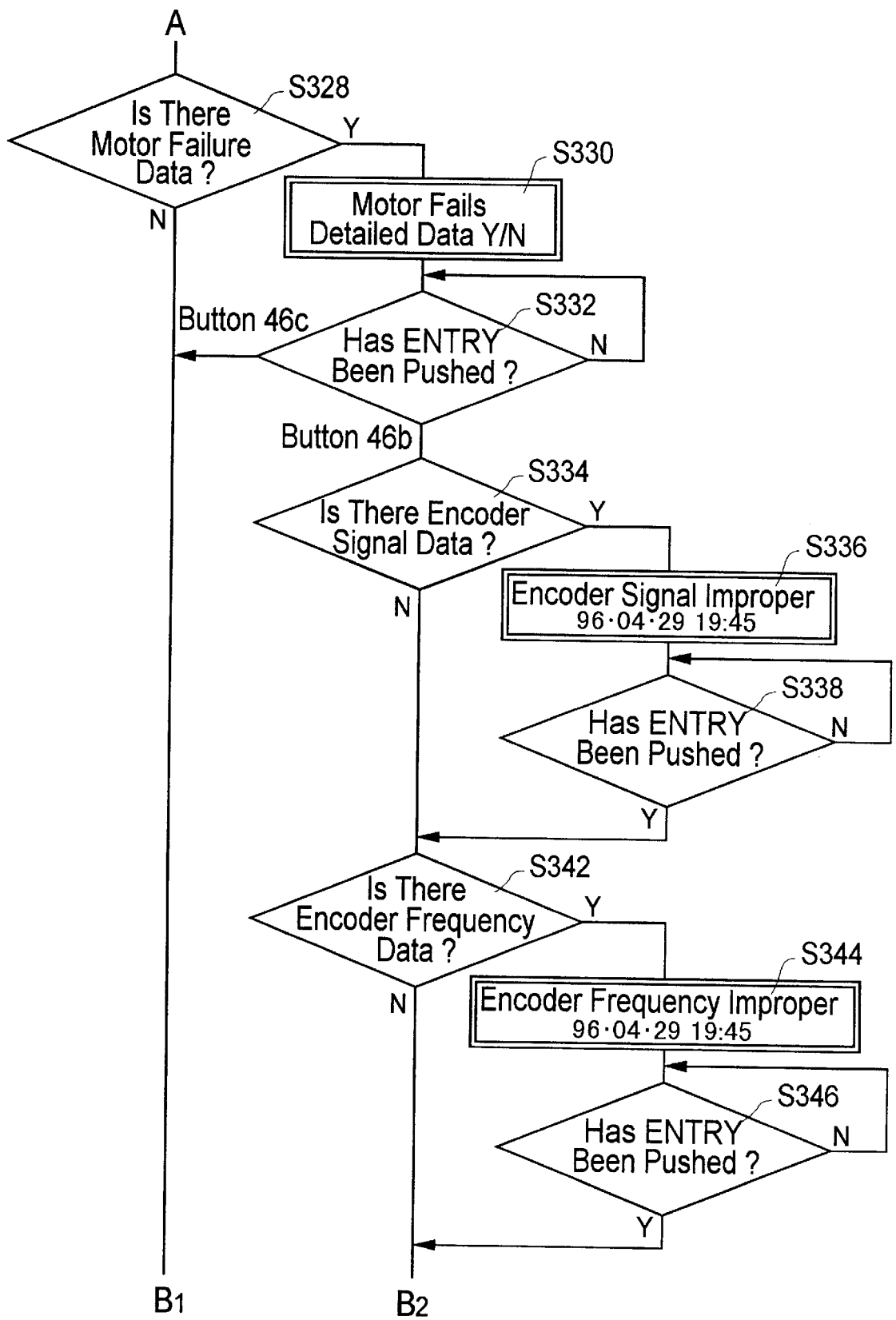

Next, as shown in FIG. 27B, a judgment as to whether or not there is any data relating to failure of the motor 6 is made (Step S328). If there is, a display "Motor Fails" and a display inquiring if detailed data is required, "Detailed Data Y/N", are displayed (Step S330). If detailed data is required, the SHIFT button 46*b* is pressed, and if it is not required, the SHIFT button 46*c* is pressed. Then, the ENTRY button 46*a* is pressed and a judgment as to which one of the SHIFT buttons 46*b* and 46*c* has been pressed is made (Step S332). If it is judged that the SHIFT button 46*c* has been pressed, no detailed data is displayed, and the next processing is carried out.

If the SHIFT button 46*b* has been pressed, a judgment is made as to whether there is data showing that the encoder signal is improper (Step S334). If there is, a display "Encoder Signal Improper" and a display of the date and time of day of occurrence of improper encoder signal are displayed on the display 44 (Step S336) in accordance with the data showing that the encoder signal is improper. Next, whether the ENTRY button 46*a* has been pushed or not is judged (Step S338), and, if not yet, Step S338 is repeated until the ENTRY button 46*a* is pressed, with the same displays on the display 44 maintained.

If the pressing of the ENTRY button 46*a* is detected in Step S338, a judgment is made as to whether there is data showing that the encoder frequency is improper (Step S342). If there is, a display "Encoder Frequency Improper" and a display of the date and time of day of occurrence of improper encoder frequency are displayed on the display 44 (Step S344). Then, a judgment as to whether the ENTRY button 46*a* has been pushed or not is made (Step S346), and, if not, Step S346 is repeated until the ENTRY button 46*a* is pushed, with the same displays maintained.

Figure 27C:
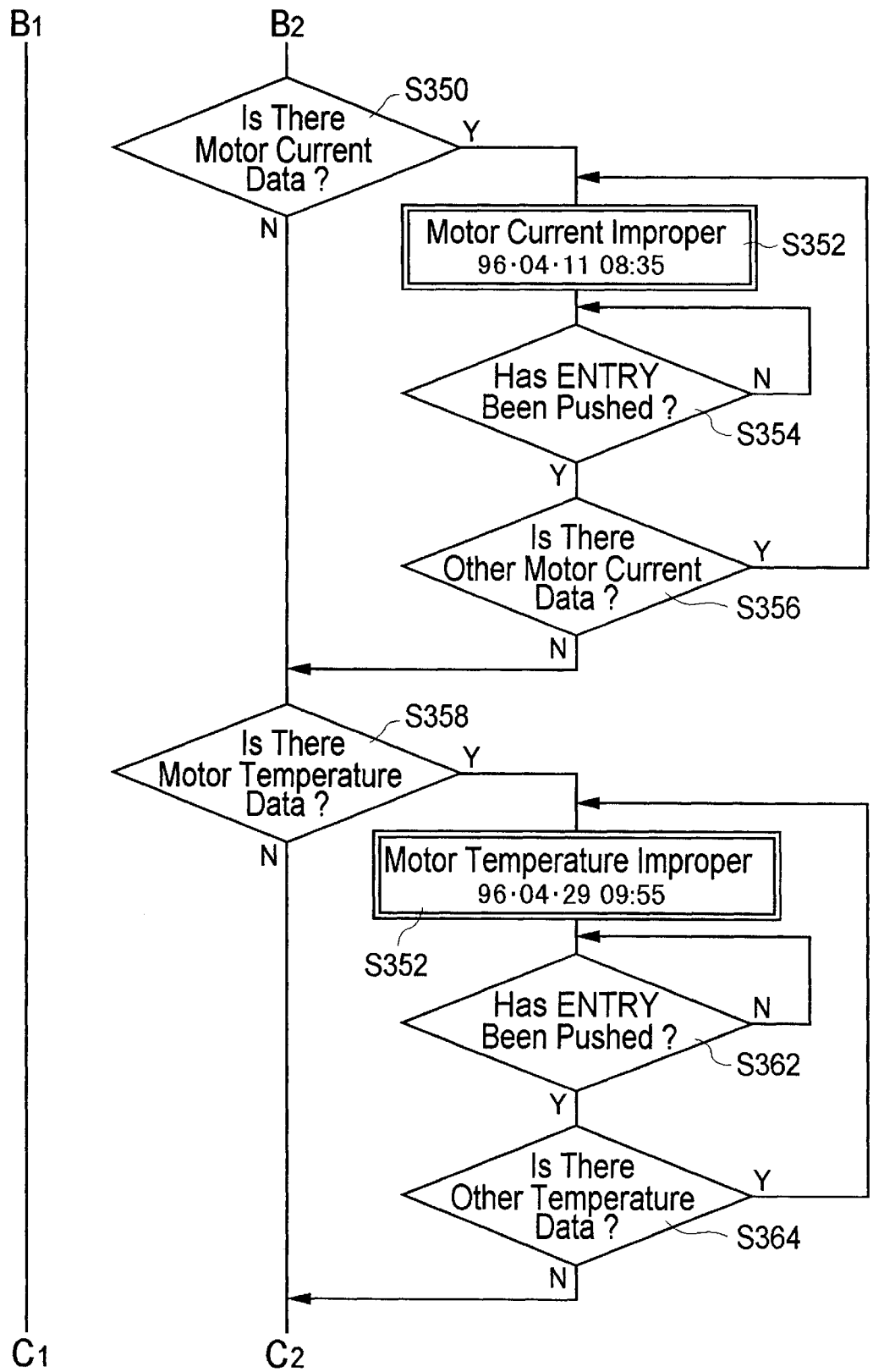

If it is detected in Step S346 that the ENTRY button 46*a* has been pushed, a judgment is made as to whether there is data showing that the motor current is improper or not (Step S350), as shown in FIG. 27C. If there is, a display "Motor Current Improper" and a display of the date and time of day of occurrence of improper motor current are displayed on the basis of the data first stored (Step S352). Then, whether the ENTRY button 46*a* has been pushed or not is judged (Step S354). If it is judged that the ENTRY button 46*a* has not yet been pushed, Step S354 is repeated until the ENTRY button 46*a* is pushed, with the same displays maintained. If it is judged that the ENTRY button 46*a* has been pushed, a judgment as to whether or not there is any other data relating to impropriety of the motor current is made (Step S356). If there is, the processing returns to Step S352, and the display "Encoder Frequency Improper" and a display of the date and time of day of the next occurrence of improper encoder frequency are displayed.

After all of the data relating to the motor current impropriety are displayed, a judgment is made as to whether there is any data showing that the motor temperature is improper (Step S358). If there is, a display "Motor Temperature Improper" and a display of the date and time of day of occurrence of improper motor temperature are displayed on the basis of the first stored data (Step S360). Next, whether the ENTRY button 46*a* has been pressed or not is judged (Step S362), and if not yet, Step S362 is repeated, with the same displays maintained on the display 44. When the ENTRY button 46*a* is pressed, a judgment as to whether there is any other data relating to improper motor temperature is made (Step S364). If there is, the processing returns to Step S360 and the display "Motor Temperature Improper" and a display of the date and time of day of the next occurrence of improper motor temperature are displayed.

Figure 27D:
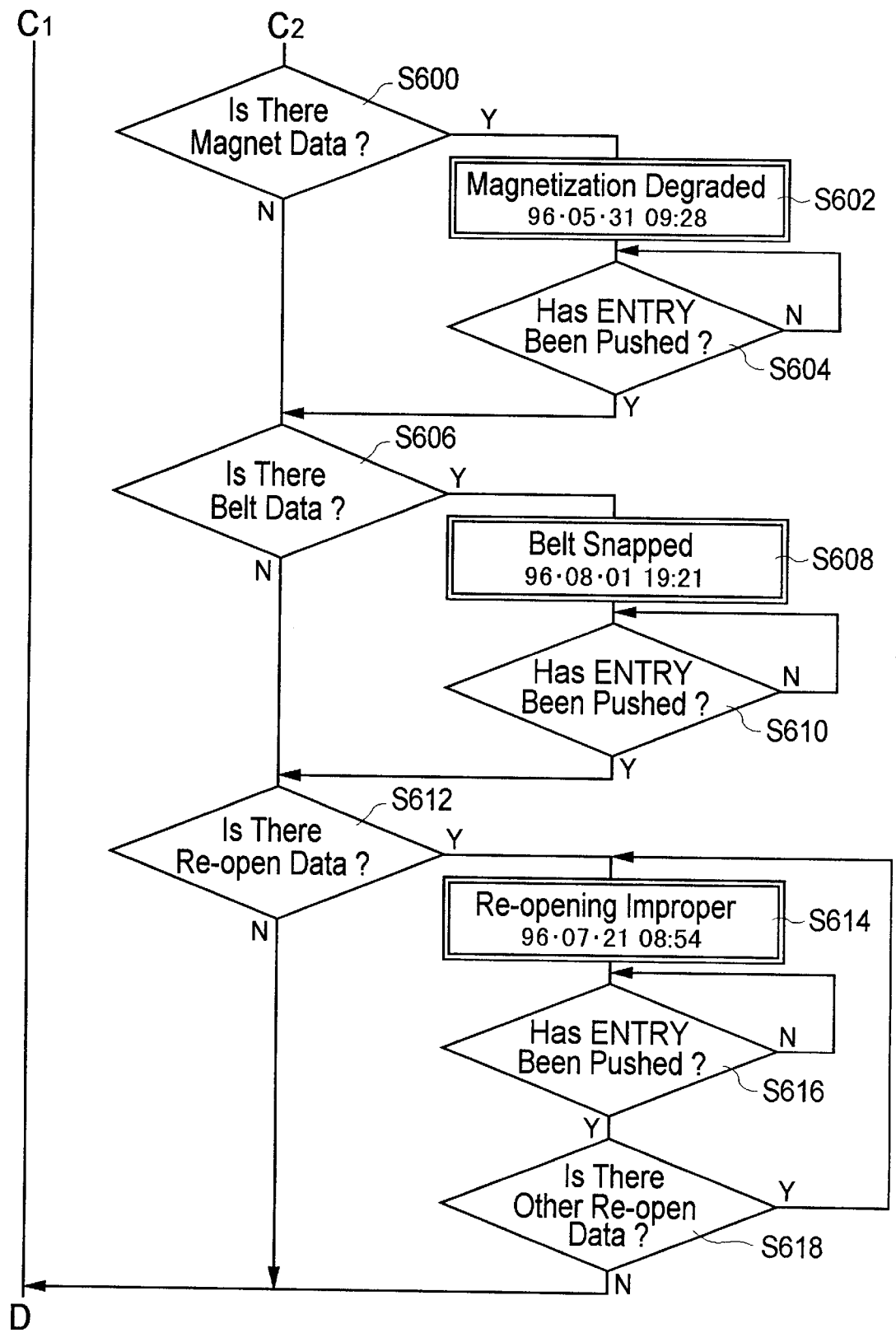

Then, as shown in FIG. 27D, a judgment is made as to whether there is data showing that the magnetization of the motor magnet has been degraded (Step S600). If there is, a display "Magnet Degraded" and a display of the date and time of day of occurrence are displayed on the display (Step S602). Next, a judgment as to whether the ENTRY button 46*a* has been pushed or not is made (Step S604). If not, Step S604 is repeated, with the same displays maintained on the display 44.

If the ENTRY button 46*a* is pushed, a judgment is made as to whether there is data showing that the belt 4*c* has been snapped or not (Step S606). If there is, a display "Belt Snapped" and a display of the date and time of day of occurrence are displayed on the display 44 (Step S608). Then, whether the ENTRY button 46*a* has been pushed or not is judged (Step S610). If not, Step S610 is repeated, with the same displays displayed.

When the ENTRY button 46*a* is pushed, then, a judgment is made as to whether there is data relating to the re-opening operation of the doors (Step S612). If there is, a display "Re-opening Improper" and a display of the date and time of day of occurrence of improper reopening operation of the doors are displayed on the basis of the data first stored (Step S614). Next, whether the ENTRY button 46*a* has been pushed or not is judged (Step S616). If not, Step S616 is repeated, with the same displays retained on the display 44. If the ENTRY button has been pushed, a judgment is made as to whether or not there is any other data relating to improper re-opening operation of the doors (Step S618). If there is, the processing returns to Step S614, and the display "Re-opening Improper" and a display of the date and time of day of occurrence of the second improper re-opening operation of the doors are displayed.

Figure 27E:
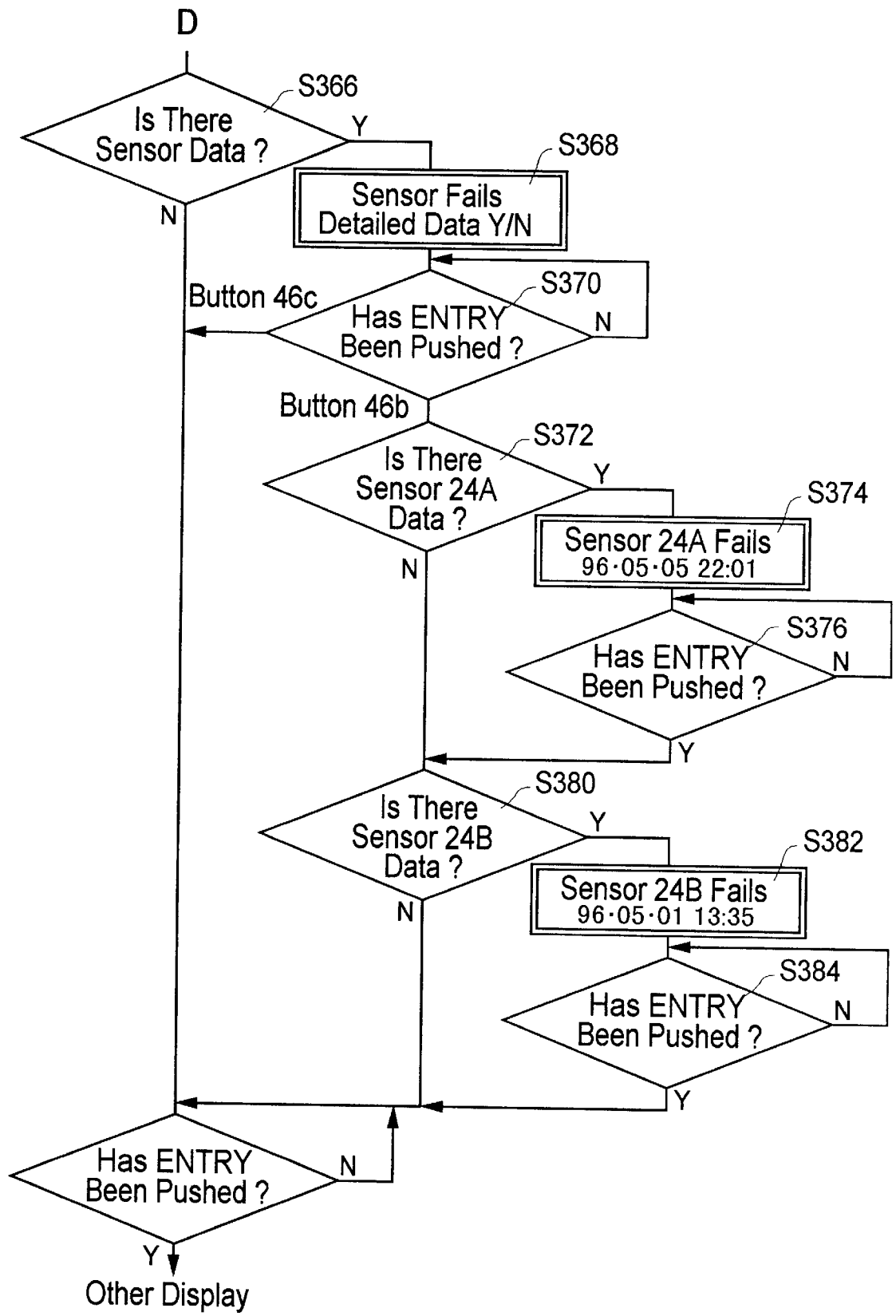

After all of the data relating to improper re-opening operation of the doors are displayed, a judgment is made as to whether there is any data showing that sensors fail (Step S366), as shown in FIG. 27E. If there is, the display 44 indicates that a sensor(s) is malfunctioning and also makes an inquiry as to whether detailed information of the sensor's failure is required or not (Step S368). If detailed information is required, the SHIFT button 46*b* is pressed, and if not, the SHIFT button 46*c* is pressed. Then, the ENTRY button 46*a* is pressed to make a judgment as to which one of the SHIFT buttons 46*b* and 46*c* has been pressed (Step S370). If the SHIFT button 46*c* has been pushed, no detailed information is displayed, and the next processing is carried out.

On the other hand, if the SHIFT button 46*b* has been pushed, a judgment is made as to whether or not there is data showing that the sensor 24A fails (Step S372). If there is, a display "Sensor 24A Fails (1)" or "Sensor 24A Fails (2)" and a display of the date and time of day of occurrence of the failure are displayed (Step S374). Next, whether the ENTRY button 46*a* has been pushed or not is judged (Step S376). If not, Step S376 is repeated, and the same displays continue to be displayed.

If the ENTRY button 46*a* has been pushed, a judgment is made as to whether there is data relating to failure of the sensor 24B (Step S380). If there is, a display "Sensor 24B Fails (1)" or "Sensor 24B Fails (2)" and a display of the date and time of day of occurrence of the failure are displayed (Step S382). Next, whether the ENTRY button 46*a* has been pushed or not is judged (Step S384). If not, Step S384 is repeated, and the same displays continue to be displayed.

Finally, whether the ENTRY button 46a has been pushed or not is judged (Step S396), and, if not, Step S396 is repeated. If the ENTRY button 46a has been pushed, other display (not shown) for executing other processing is displayed on the display 44.

It has been described that data relating to failure or malfunction or improper states are stored in the EEPROM 18, but such data may be transmitted through an I/O interface 50 and an RS-232C driver-receiver 52 to an output unit, e.g. a personal computer 54 for storage therein, as shown in FIG. 1. If data is transmitted to the personal computer 54 immediately after failure or the like occurs, the personal computer 54 can store time and date of receiving such data on the basis of its own timer unit, and, therefore, there is no need to transmit data relating to the time and date of occurrence of failure or the like. FIG. 28 shows an example of display of various types of failure and dates and times of occurrences of such failure, displayed on the personal computer 54. In this display, various types of failure and dates and times of occurrences are displayed together.

Identification of Failing Portions

The display on the display 44 of the Handy Terminal provides indication of devices which fail to operate properly. If the cause for the displayed failure can be identified, the maintenance man can readily take the most effective steps for removing the failure. For this purpose, the Handy Terminal may be provided with instruction means which can provide indications of actions to be taken for removing the displayed failure. When failure of various devices are displayed, the instruction means provides indications which help the maintenance man to determine failing portions of the devices by means of buttons on it.

Figure 29:
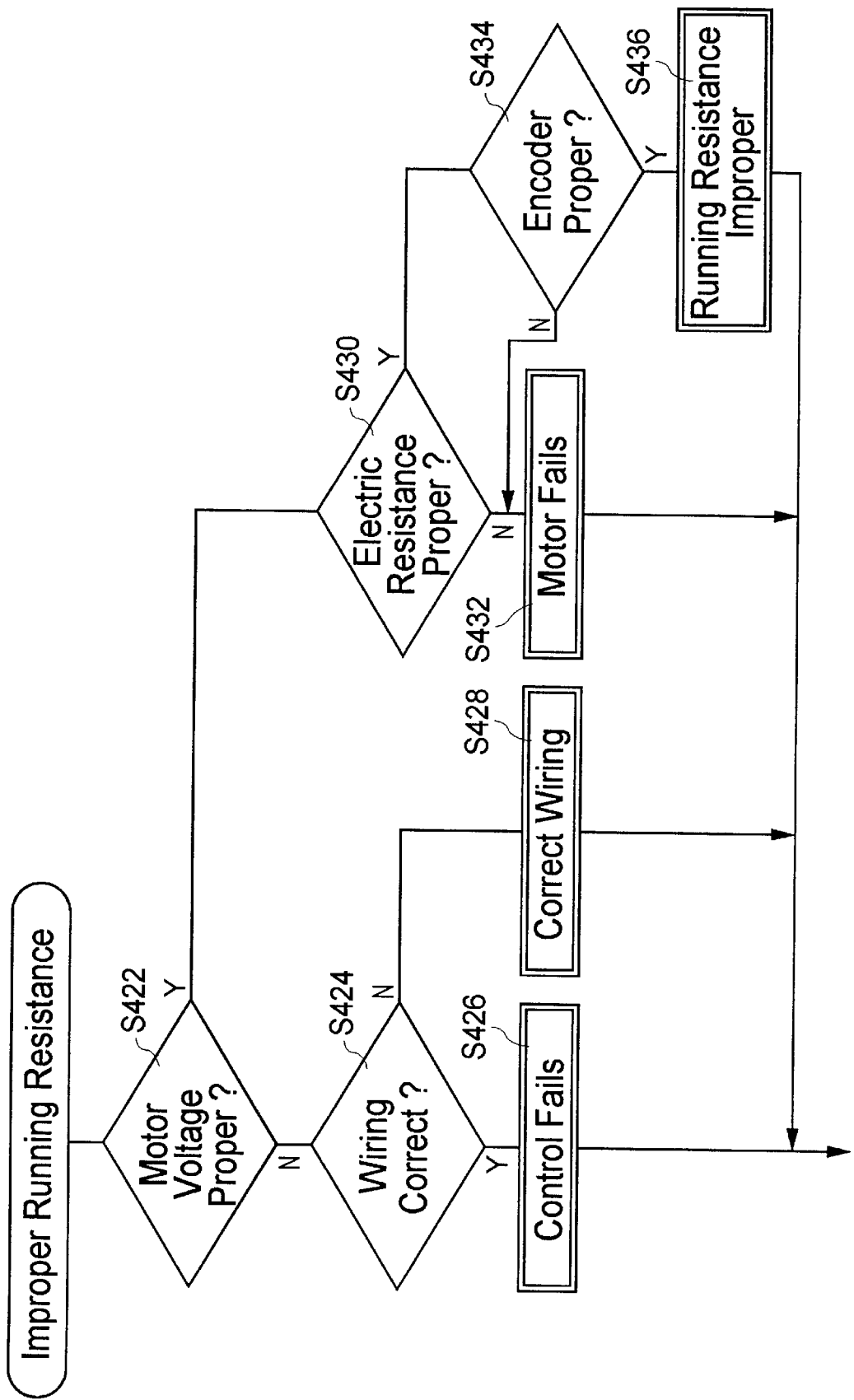
FIG. 29 is a flow chart for providing display of actions to be taken with respect to failure or malfunction of the system of FIG. 1.

FIG. 29 is a flow chart for displaying what actions should be taken when the running resistance of the doors are judged to be improper. When the running resistance of the doors is judged improper, the following processing takes place automatically or in response to the pressing of appropriate buttons. The cause for improper running resistance generally is failure of the driving force transmitting arrangement 4, but, sometimes, the running resistance of the doors could be judged improper when the control section 10, the motor 6 or the encoder 22 fails.

First, an interrogation as to whether the voltage applied to the motor 6 is proper or not is displayed on the display 44. Examining the voltage applied to the motor, the maintenance man inputs the answer to the interrogation by pressing a button on the Handy Terminal. Whether the motor voltage is proper or not is judged from the inputted value (Step S422). If it is not proper, an interrogation as to whether the wiring to the motor is correct or not is displayed. Inspecting the wiring to the motor, the maintenance man inputs the result of the inspection into the Handy Terminal by means of the button. Whether the motor wiring is correct or not is judged in Step S424. If it is correct, the control section 10 is judged to fail since both the voltage applied to the motor 6 and the motor wiring are appropriate. Then, a display "Control Fails" is provided (Step S426). If wiring impropriety is inputted, a display is provided on the display 44, instructing the maintenance man to correct the wiring to the motor (Step S428).

If an input indicating that the voltage to the motor 6 is improper is applied in Step S422, an interrogation as to if the electrical resistance of the motor 6 is proper or not is displayed. Then, the maintenance man examines the resistance of the motor 6 and inputs the result of the examination into the control section by means of the button. Then, the inputted value is judged as to whether it indicates that the electrical resistance of the motor 6 is proper or not (Step S430). If it is improper, a display "Motor Fails" is provided on the display (Step S432). In accordance with this indication, the maintenance man can replace the motor 6 with a new one.

If the inputted value is judged to indicate that the electrical resistance of the motor is proper in Step S430, an interrogation as to whether the encoder is properly operating or not is displayed. Then, the maintenance man inspects the encoder and inputs the result of the inspection into the control section by means of the button. Then, a judgment is made as to whether the input value indicates that the encoder is properly operating or not (Step S434), and if the input value indicates that the encoder is not properly operating, it can be judged that the motor fails. Then, Step S432 is executed to provide a display indicating that the the motor fails. If the encoder is judged to be properly operating in Step S434, it can be concluded that there is failure in the driving force transmitting arrangement 4 or its neighborhood, and a display "Running Resistance Improper" is provided (Step S436). Then, the maintenance man inspects the driving force transmitting arrangement 4.

The actions to be taken against other failure or malfunction than the above-described ones can be successively displayed on the Handy Terminal by pressing the button switches on the Handy Terminal.

Figure 30:
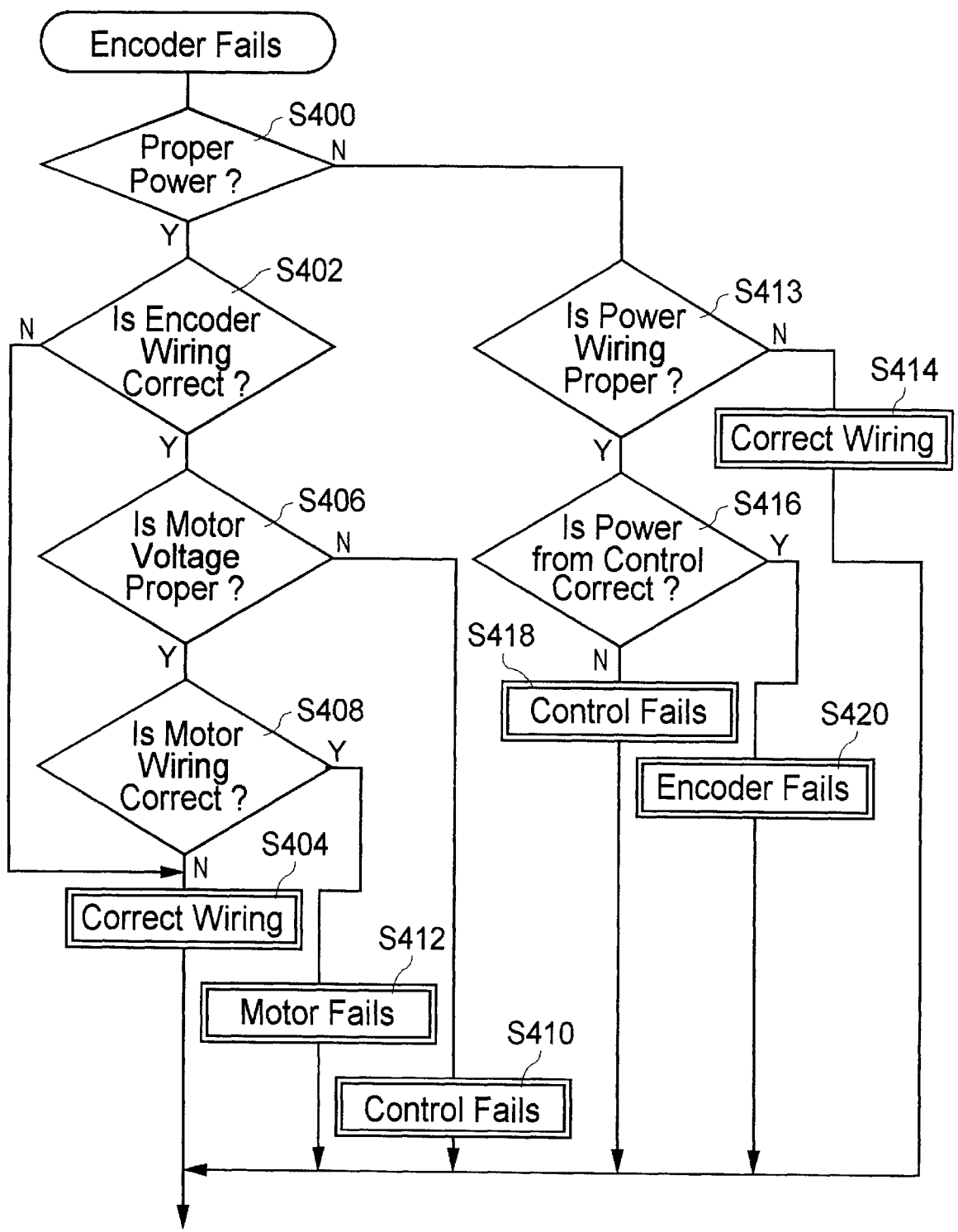
FIG. 30 is another flow chart for providing display of actions to be taken with respect to different failure or malfunction of the system of FIG. 1.

For example, FIG. 30 shows a flow chart for identifying a failing portion of the door system, when a display "Encoder Fails" is provided on the display 44 as a result of an examination other than the examination of the encoder signal and the examination of the encoder frequency. Similar to the case shown in FIG. 29, the illustrated processing has been prepared, taking into account the fact that even when a display indicates the encoder's failure, actually the motor or the control section, instead of the encoder, may have failed.

First, an interrogation as to if power is properly supplied to the encoder is displayed on the display 44. The maintenance man, inspecting the encoder as to if power is properly supplied to the encoder, and inputs the result of the inspection by the buttons on the Handy Terminal. A judgment as to whether the input indicates that power is properly supplied or not is judged (Step S400). If power is properly supplied, an interrogation as to whether wiring for the phases A and B signals is correct or not is displayed, and the maintenance man, inspecting the wiring, inputs the result by pressing the button. Whether the wiring is correct or not is judged (Step S402), and, if not correct, a display "Correct Wiring" is provided on the display 44 (Step S404). Then, the maintenance man can follow the instructions on the display to remove the indication of the encoder failure.

If, in Step S402, it is judged that the wiring is proper, the display on the display 44 changes to an interrogation as to whether the motor voltage is proper or not. Seeing this display, the maintenance man measures the motor voltage and inputs the result by pressing the button switch on the Handy Terminal. On the basis of the inputted value, a judgment is made as to whether the motor voltage is proper or not (Step S406), and, if the motor voltage is proper, an interrogation as to whether the motor wiring is correct or not is displayed on the display 44. Then, the maintenance man inspects the motor wiring and input the result of the inspection by means of the button switch. A judgment as to whether the motor wiring is correct or not is made on the basis of the inputted result (Step S408). If the motor wiring is judged to be incorrect, a display "Correct Wiring" is made on the display 44 (Step S404), and the maintenance man corrects the motor wiring to remove the detected encoder failure.

In Step S406, if the motor voltage is judged not proper, it may be judged that the control unit 3 as a whole is malfunctioning, and a display "Control Fails" is made (Step S410). Then, the maintenance man replaces the control section 10 to thereby prevent the display "Encoder Fails" from being displayed on the display 44.

If the motor wiring is judged to be correct in Step S408, it may be judged that the motor 6 itself fails. A display "Motor Fails" is then provided on the display 44 (Step S412). Seeing the display, the maintenance man can replace the motor 6 to prevent the display "Encoder Fails" from being provided on the display 44.

If, in Step S400, it is not judged that power is not properly supplied to the encoder, an interrogation as to whether the encoder power supply wiring is correct or not is displayed. Then, the maintenance man inspects the encoder power supply wiring, and inputs the result of the inspection by means of the button switch on the Handy Terminal. On the basis of the inputted result, a judgment as to whether the encoder power supply wiring is correct or not is made (Step S413). If the wiring is not correct, the display 44 displays "Correct Encoder Wiring" (Step S414). Then, the maintenance man can correct the encoder wiring to prevent the display "Encoder Fails" from being displayed.

If the encoder wiring is judged to be correct in Step S413, an interrogation is displayed on the display 44 as to whether power is properly supplied to the encoder from the control section. Then, the maintenance man inspects the encoder as to if power is properly supplied from the control section 10, and the result is inputted into the control section 10 by means of the button switch on the Handy Terminal. A judgment is made as to whether power is properly supplied from the control section or not (Step S416). If power is not properly supplied from the control section, it may be concluded that the control section fails, and a display "Control Fails" is displayed (Step S418). Then, the maintenance man replaces the entire control unit 3.

If it is judged in Step S416 that power is properly supplied from the control section to the encoder, the encoder can be judged to fail. Then, a display "Encoder Fails" is provided (Step S420), and the maintenance man replaces the encoder with a new one.

What is claimed is:

1. An automatic door system with self-diagnosing function, comprising:

a door;

a door driving arrangement including a motor, for driving said door to open and close; a sensor for sensing an object approaching and leaving said door; and a control unit including a control section for controlling said motor in accordance with a signal supplied thereto from said sensor;

wherein said control section includes failure detecting means for examining said motor, said sensor and said control section for failure or malfunction thereof, and a memory section for storing the result of examination made by said failure detecting means; and said automatic door system further includes an output unit for providing, on the basis of the results of examination stored in said memory section, an indication of failure or malfunction individually for any of said motor, said sensor and said control section which is failing or malfunctioning.

2. The automatic door system with self-diagnosing function according to claim 1 wherein said control section comprises:

a RAM into and from which data for controlling said motor is written and read;

a ROM in which a program for controlling said door is stored; and an EEPROM into and from which operating parameters of said door are written and read;

said failure detecting means examining said RAM, ROM and EEPROM in the named order after said control unit is powered on.

3. The automatic door system with self-diagnosing function according to claim 1 wherein:

said control section includes an EEPROM into and from which various data including operating parameters of said door are written and read; and said failure detecting means examines said EEPROM each time said data is written into said EEPROM.

4. The automatic door system with self-diagnosing function according to claim 1 wherein:

said failure detecting means determines that said control section is failing or malfunctioning when said control section is reset, by making a judgment as to whether the resetting is due to disorderly execution of said door control program or due to the power-on of said control section.

5. The automatic door system with self-diagnosing function according to claim 1 wherein:

said failure detecting means computes a current running resistance of said door from the rotation rate of said motor and the voltage applied to said motor, and determines that said door is failing or malfunctioning when the difference between said current running resistance and the running resistance at the time of installation of said automatic door system exceeds a predetermined value.

6. The automatic door system with self-diagnosing function according to claim 1 wherein:

said motor includes a rotation detecting section which develops a pulse signal representative of the rotation rate of said motor; and said failure detecting means determines that said rotation detecting section is failing or malfunctioning when the number of a reference clock signals measured in one cycle of said pulse signal is less than a predetermined value.

7. The automatic door system with self-diagnosing function according to claim 1 wherein:

said motor includes a rotation detecting section which develops two-phase pulse signals, each of said pulse signals being representative of the rotation rate of said motor; and said failure detecting means determines that said rotation detecting section is failing or malfunctioning when one of said two-phase pulse signals exhibits no change during a time interval when the other pulse signal exhibits a predetermined number of changes.

8. The automatic door system with self-diagnosing function according to claim 1 wherein:

said motor includes a rotation detecting section which develops three-phase pulse signals, each of said pulse signals being representative of the rotation rate of said motor; and said failure detecting means determine that said rotation detecting section is failing or malfunctioning when any one of said three-phase pulse signals exhibits no changes during one cycle of said three-phase signals.

9. The automatic door system with self-diagnosing function according to claim 1 wherein:
   said sensor includes means for developing a pulsating sensor signal when said sensor fails or malfunctions; and
   said failure detecting means determines that said sensor is failing or malfunctioning by detecting said pulsating sensor signal.

10. The automatic door system with self-diagnosing function according to claim 1 wherein:
    said sensor includes means for developing different types of pulsating signals which respectively indicate the necessity of inspection and replacement of said sensor; and
    said failure detecting means determines the types of said pulsating signals to thereby judge which the detected failure or malfunction requires, inspection or replacement of said sensor.

11. The automatic door system with self-diagnosing function according to claim 1 wherein:
    said motor includes a motor current monitoring section for monitoring current flowing in said motor; and
    said failure detecting means determines that said motor is failing or malfunctioning when the current detected by said motor current monitoring section is above a predetermined value.

12. The automatic door system with self-diagnosing function according to claim 1 wherein:
    said motor includes a motor temperature monitoring section for monitoring the temperature of said motor; and
    said failure detecting means determines that said motor is failing or malfunctioning when the temperature of said motor detected by said motor temperature monitoring section is above a predetermined value.

13. The automatic door system with self-diagnosing function according to claim 1 wherein:
    said motor includes a motor rotation detecting section for developing a pulse signal representative of the rotation rate of said motor; and
    said failure detecting means determines that said door driving arrangement is failing or malfunctioning when the number of the pulse signals developed when said door travels from its fully closed or opened position to its fully opened or closed position is larger than a predicted value.

14. The automatic door system with self-diagnosing function according to claim 1 wherein:
    said motor includes a motor rotation detecting section for developing a pulse signal representative of the rotation rate of said motor; and
    said failure detecting means determines that said motor rotation detecting section is failing or malfunctioning when the ratio of the number of reference clock pulses counted between a rising edge and a falling edge in one cycle of said pulse signal to the number of reference clock pulses counted between said falling edge to a next rising edge is outside a predetermined range.

15. The automatic door system with self-diagnosing function according to claim 1 wherein:
    said control section includes door re-opening means for opening said door back to its fully opened position in the closing operation of said door; and
    said failure detecting means determines that said door is failing or malfunctioning when the re-opening of said door repeats more than a predetermined number of times.

16. An automatic door system with self-diagnosing function, comprising:
    a door;
    a motor for driving said door to open and close;
    a control unit for controlling said motor; and
    a sensor for sensing an object approaching and leaving said door; wherein:
       said control unit includes a control section for controlling said motor in accordance with a signal supplied thereto from said sensor;
       said control section includes failure detecting means for examining said motor, said sensor and said control section for failure or malfunction thereof; and
       said failure detecting means interrupts the driving of said door so that said door can be manually opened or closed, when said failure detecting means detects failure or malfunction of said door system.

17. An automatic door system with self-diagnosing function, comprising:
    a door;
    a motor for driving said door to open and close;
    a control unit for controlling said motor; and
    a sensor for sensing an object approaching and leaving said door;
    wherein:
       said control unit includes a control section for controlling said motor in accordance with a signal supplied thereto from said sensor;
       said control section includes failure detecting means for examining said motor, said sensor and said control section for failure or malfunction thereof, and a memory section for storing the result of examination made by said failure detecting means; and
       said automatic door system further includes an output unit for outputting an indication of steps to be taken in order to identify the cause of detected failure or malfunction on the basis of the result of examination stored in said memory section.

18. An automatic door system with self-diagnosing function, comprising:
    a door;
    a motor for driving said door to open and close;
    a control unit for contolling said motor; and
    a sensor for sensing an object approaching and leaving said door;
    wherein:
       said control unit includes a control section for controlling said motor in accordance with a signal supplied thereto from said sensor;
       said control section includes failure detecting means for examining said motor, said sensor and said control section for failure or malfunction thereof, and a memory section for storing the result of examination made by said failure detecting means together with the time of occurrence of a detected failure or malfunction; and
       said automatic door system further includes an output unit for outputting the result of examination and the time of occurrence of said detected failure or malfunction stored in said memory section.

19. An automatic door system with self-diagnosing function, comprising:
    a door;
    a motor for driving said door to open and close;

a control unit for controlling said motor; and a sensor for sensing an object approaching and leaving said door; wherein:

said control unit includes a control section for controlling said motor in accordance with a signal supplied thereto from said sensor;

said automatic door system further includes a motor temperature monitoring section for monitoring the temperature of said motor;

said control section includes failure detecting means for making a judgment that said motor is failing or malfunctioning when the motor temperature as monitored by said motor temperature monitoring section is above a predetermined value; and when said failure detecting means judges that said motor is failing or malfunctioning, said failure detecting means permits said door to be opened or closed with restricted operating parameters.

20. The automatic door system according to claim 19 wherein said failure detecting means causes said door to be opened or closed at a low speed when said failure detecting means judges that said motor is failing or malfunctioning.

21. The automatic door system according to claim 19 wherein said failure detecting means causes said door to be opened and closed without being urged against each other and against doorjambs at the fully opened and closed positions of said door, respectively, when said failure detecting means judges that said motor is failing or malfunctioning.

22. The automatic door system according to claim 19 wherein said failure detecting means extends a door open time period during which said door is held open, when said failure detecting means judges that said motor is failing or malfunctioning.

23. An automatic door system with self-diagnosing function, comprising:

a door;

a motor for driving said door to open and close;

a control unit for controlling said motor; and a sensor for sensing an object approaching and leaving said door; wherein:

said control unit includes a control section for controlling said motor in accordance with a signal supplied thereto from said sensor;

said automatic door system further includes a motor current monitoring section for monitoring the current flowing through said motor;

said control sections includes failure detecting means for making a judgment that said motor is failing or malfunctioning when the current as monitored by said motor current monitoring section is above a predetermined value; and when said failure detecting means judges that said motor is failing or malfunctioning, said failure detecting means permits said door to be opened or closed with limited operating parameters.

24. The automatic door system according to claim 23 wherein said failure detecting means causes said door to be opened or closed at a low speed when said failure detecting means judges that said motor is failing or malfunctioning.

25. The automatic door system according to claim 23 wherein said failure detecting means causes said door to be opened and closed without being urged against each other and against doorjambs at the fully opened and closed positions of said door, respectively, when said failure detecting means judges that said motor is failing or malfunctioning.

26. The automatic door system according to claim 23 wherein said failure detecting means extends a door open time period during which said door is held open, when said failure detecting means judges that said motor is failing or malfunctioning.

* * * * *